(12) United States Patent
Barlage et al.

(10) Patent No.: US 6,412,589 B1
(45) Date of Patent: *Jul. 2, 2002

(54) TORQUE ARM ASSEMBLY FOR A MOTOR VEHICLE

(75) Inventors: John A. Barlage, Rochester Hills; Richard D. Frazer, Berkley; Theodor Gassmann, Rochester; Robert Genway-Haden, Rochester Hills, all of MI (US); Werner Hoffmann, Siegburg (DE); Philip Hutula, Auburn Hills, MI (US)

(73) Assignee: GKN Automotive, Inc., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/714,931

(22) Filed: Nov. 17, 2000

Related U.S. Application Data

(62) Division of application No. 09/272,093, filed on Mar. 18, 1999, now Pat. No. 6,209,673.
(60) Provisional application No. 60/086,512, filed on May 22, 1998.

(51) Int. Cl.$^7$ .............................................. B60K 17/00
(52) U.S. Cl. ...................................... 180/377; 180/378
(58) Field of Search ............................... 180/360, 377, 180/378, 382; 403/220, 225

(56) References Cited

U.S. PATENT DOCUMENTS 4,866,624 A    9/1989   Nishhikawa et al. ... 364/426.03

(List continued on next page.)

OTHER PUBLICATIONS

SAE Technical Paper Series entitled "VISCO–LOK: A Speed Sensing Limited–Slip Device with High Torque Progressive Engagement" by Theodor Gassmann and John Barlage.

Primary Examiner—J. J. Swann
Assistant Examiner—L. Lum
(74) Attorney, Agent, or Firm—Mick A. Nylander

(57) ABSTRACT

An all wheel drive system for a motor vehicle comprising a front differential, a pair of front halfshaft assemblies operatively connected to the front differential whereby the front differential supplies torque to the pair of front half shaft assemblies, each of the pair of front half shaft assemblies connected to a respective front wheel, a power takeoff unit operatively connected to the front differential, a constant velocity joint connected to the power takeoff unit whereby the front differential supplies torque to the constant velocity joint through the power takeoff unit, a first propshaft having a first end and a second end, the first end connected to the constant velocity joint, a plunging constant velocity joint connected to the second end of the first propshaft, a second propshaft having a first end and a second end, the first end connected to the plunging constant velocity joint, a universal joint having a first end and a second end, the first end of the universal joint connected to the second end of the second propshaft, a self contained speed sensing torque transfer device connected to the second end of the universal joint such that torque is selectively transferrable when the self contained speed sensing torque transfer device is engaged, the self contained speed sensing torque transfer device including, a hub connected to a first set of friction plates, the hub also connected to the second end of the universal joint, a housing connected to a second set of friction plates whereby the first and second set of friction plates are disposed in a selectively interconnecting relationship; a piston located adjacent the first and second set of friction plates, a self contained shear pump for generating a pressure proportional to the speed difference between the hub and the housing, the pump comprising, a feed disc affixed to the hub, a fluid reservoir, a pump disc affixed to the housing and in fluid communication with the fluid reservoir, the pump disc having a circumferential pumping groove and at least one connecting hole forming a shear channel with the feed disc, the pump generating pressure on the piston at a set speed difference such that the piston transmits pressure to the first and second set of friction plates and torque is thereby transferable from the first set of friction plates to the second set of friction plate thereby transferring torque to the housing, a rear differential connected to the housing of the speed sensing torque transfer device, and a pair of rear halfshaft assemblies operatively connected to the rear differential for transferring torque to the rear halfshaft assemblies, each of the rear halfshaft assemblies connected to a respective rear wheel whereby under normal operating conditions the all wheel drive system provides substantially all torque to the front differential, and in a slip condition when either of the front wheels begins to slip the front differential rotates at a higher speed than the rear differential and the self contained speed sensing torque transfer device engages thereby providing torque to the rear differential until the slip condition is resolved whereupon substantially all torque is transferred back to the front wheels.

7 Claims, 28 Drawing Sheets

U.S. PATENT DOCUMENTS

| | | | |
|---|---|---|---|
| 4,867,260 A | | 9/1989 | Cameron et al. ............ 180/360 |
| 5,099,944 A | | 3/1992 | Kageyama et al. ......... 180/249 |
| 5,103,690 A | | 4/1992 | Macpherson et al. .. 74/665 GB |
| 5,226,502 A | | 7/1993 | Kameda ..................... 180/248 |
| 5,232,209 A | * | 8/1993 | De Fontenay ............... 267/220 |
| 5,301,768 A | | 4/1994 | Ishikawa et al. ............ 180/249 |
| 5,301,769 A | | 4/1994 | Weiss ........................ 180/249 |
| 5,323,870 A | | 6/1994 | Parigger et al. ............ 180/197 |
| 5,335,747 A | | 8/1994 | Müller ....................... 180/249 |
| 5,346,032 A | | 9/1994 | Sasaki ................. 364/424.098 |
| 5,388,679 A | | 2/1995 | Inoue et al. .................. 192/35 |
| 5,396,421 A | | 3/1995 | Niikura et al. ........... 364/424.1 |
| 5,402,859 A | * | 4/1995 | Boberg et al. .............. 180/360 |
| 5,472,063 A | * | 12/1995 | Watanabe et al. ........... 180/274 |
| 5,526,912 A | | 6/1996 | Gassmann .................... 192/57 |
| 5,562,191 A | | 10/1996 | Gassmann ............... 192/58.42 |
| 5,609,353 A | * | 3/1997 | Watson ....................... 280/707 |
| 5,701,247 A | | 12/1997 | Sasaki ........................ 180/233 |
| 5,742,917 A | | 4/1998 | Matsuno ..................... 701/69 |
| 5,752,211 A | | 5/1998 | Takasaki et al. ............... 701/69 |
| 5,833,026 A | * | 11/1998 | Zetterstrom et al. ........ 180/360 |
| 5,879,026 A | * | 3/1999 | Dostert et al. .............. 280/781 |
| 5,881,990 A | * | 3/1999 | Kawamura et al. ......... 248/638 |
| 5,915,495 A | * | 6/1999 | Kerlin et al. ................ 180/291 |
| 5,921,568 A | * | 7/1999 | Cruise et al. .......... 280/124.134 |
| 5,975,541 A | * | 11/1999 | Harara et al. ............... 280/5.524 |
| 5,997,038 A | * | 12/1999 | Dostert et al. .............. 280/781 |
| 6,161,822 A | * | 12/2000 | Hurst et al. ................. 267/220 |

* cited by examiner $$p = F\left[\frac{\eta; V_R; L}{s^2}\right]$$

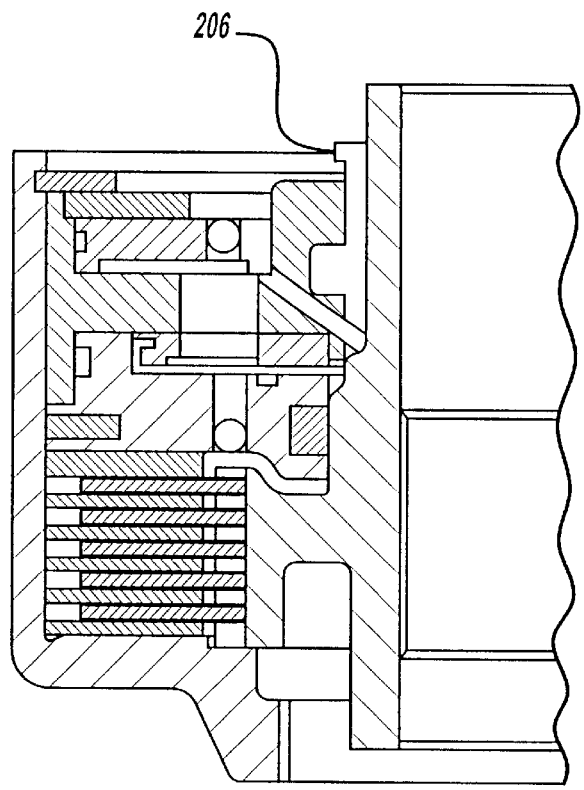
*Figure - 16*
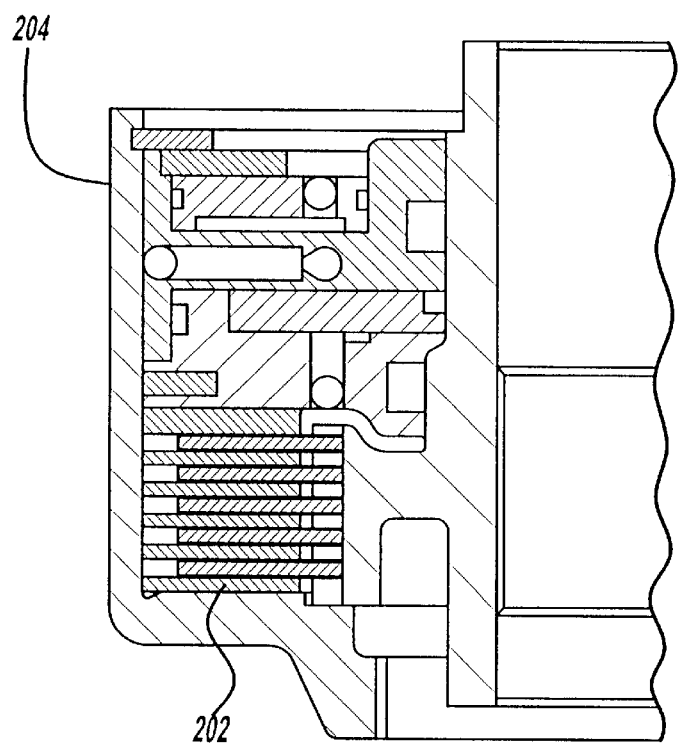

TORQUE ARM ASSEMBLY FOR A MOTOR VEHICLE

This is a divisional of application(s) Ser. No. 09/272,093 filed on Mar. 18, 1999 now U.S. Pat. No. 6,209,673, which claims benefit of Ser. No. 60/086,512 filed on May 22, 1998.

TECHNICAL FIELD

The present invention relates to an all wheel drive system for a motor vehicle and more specifically, to an all wheel drive system including a pair of front halfshaft assemblies, a power take-off unit, a first propshaft assembly, a second propshaft assembly, a means for controlling torque transmission from the front halfshaft assemblies to the rear halfshaft assemblies, a rear differential, a pair of rear halfshaft assemblies and a torque arm mounting system.

BACKGROUND ART

There are generally four (4) main types of automotive driveline systems. More specifically, there exists a full-time front wheel drive system, a full-time rear wheel drive system, a part-time four wheel drive system, and an all wheel drive system. Most commonly, the systems are distinguished by the delivery of power to different combinations of drive wheels, i.e., front drive wheels, rear drive wheels or some combination thereof. In addition to delivering power to a particular combination of drive wheels, most drive systems permit the respectively driven wheels to rotate at different speeds. For example, the outside wheels must rotate faster than the inside drive wheels, and the front wheels must normally rotate faster than the rear drive wheels.

Often, the inside and outside drive wheels of a two wheel drive system are connected to a differential mechanism which permits the opposite drive wheels to rotate at different speeds while delivering an approximately equal amounts of drive torque to each. Delivering approximately equal amount of torque to the drive wheels independently of the rotational speed sometimes significantly limits the total amount of torque which can be delivered to the drive wheels when one of the drive wheels loses traction. For example, if either drive wheel does not have sufficient traction to sustain its portion of the drive torque, the amount of drive torque which can be delivered to the other drive wheel is similarly reduced.

In an attempt to overcome this problem, there are certain modifications to differential performance which support unequal distributions of torque between the drive wheels. The unequal distributions of torque are supported by resisting any differential rotation between drive wheels. A limited differential modifies a conventional differential by including a frictional clutch mechanism which resists any relative rotation between the drive wheels. Unequal torque distribution between drive wheels is supported by sacrificing some of the differential capacity to support unequal rotational speeds between the drive wheels during cornering.

Recently, all wheel drive vehicles have been gaining popularity as a way to enhance traction capability. Instead of dividing drive power between only two wheels of a vehicle either in the front or the rear, all wheel drive vehicles divide power between all four wheels. As a result, each wheel is required to support a smaller portion of the total drive torque. However, in addition to delivering power to both the front and rear drive axle, all wheel drives must also permit the two axles to rotate at different speeds. Accordingly, driveshafts to the front and rear axles are often interconnected by a differential mechanism which permits the front and rear drive axles to rotate at different speeds while delivering approximately equal amounts of torque. Part-time four wheel drive systems permit a vehicle operator to selectively connect a second drive axle to the vehicle driveline when adverse traction conditions are encountered. It should be noted however, that if both front and rear axles are permanently interconnected by a differential mechanism, more power is expended by the drivetrain delivering power to two drive axles in comparison to delivering power to only one of the axles. Thus, adequate traction is available for a single pair of drive wheels to support the delivery of drive power and the further division of drive power among more than two wheels is not necessary. Significant power losses and reduced gas mileage sometimes occur as a result of the unnecessary transmission of drive power to additional wheels.

Part-time four wheel drive systems rely on operator judgment to select between two and four wheel drive modes. Driveshafts to the front and rear drive axles are generally coupled together in the four wheel drive mode, thereby preventing the two axles from rotating at different speeds. The drive wheels of one or the other axles tend to skid in response to courses of travel which require the front and rear axles to rotate at different speeds. Accordingly, significant power losses occur in the four wheel drive mode from the tendency of one of the axles to break the vehicle. Power is delivered to either the front or rear axle depending on whichever axle is required to rotate slower to maintain traction. This makes for unpredictable changes in vehicle handling characteristics by switching between effective front or rear wheel drive. Further, part-time four wheel drive vehicles experience the same loss of traction as two wheel drive vehicles until the four wheel drive mode is engaged.

It is also known in the art to provide a conventional differential interconnecting front and rear drive axles with a limited slip differential to further enhance traction capabilities of all wheel drive vehicles. The limited slip differential supports unequal distributions of torque between drive axles, but it also resist relative rotation between the axles. Accordingly, the same power losses occur from permanently driving an additional axle, and drive torque is unpredictably divided between the front and rear axles in response to situations requiring the drive axles to rotate at different speeds.

BRIEF SUMMARY OF THE INVENTION

It is an object of the present invention to provide an all wheel drive system which improves vehicle traction and handling during adverse driving conditions.

It is an object of the present invention to provide an all wheel drive system which incorporates a speed sensing torque transfer device which senses speed difference between the front differential and rear differential and transfers torque upon such speed difference.

It is a further object of the present invention to provide an all wheel drive system which is under normal operating conditions an all wheel drive system which operates with 100% torque to the front wheel drive system and if the front wheels begin to slip the front differential rotates at a higher speed than the rear differential consequently with the power take-off unit and the front propshaft causing the rear propshaft to rotate at a higher speed such that the speed sensing torque transfer device senses the speed difference between the inputs of the rear propshaft and the rear differential and engages whereby the speed sensing torque transfer device transmits torque to the rear differential and wheels until the slip condition at the front wheels is resolved and all wheels are thereby rotating at the same speed.

It is a further object of the present invention to provide a unsymmetrical torque arm for use in conjunction with the speed sensing torque transfer device and rear differential to support the rear differential.

It is a further object of the present invention to provide a preassembled torque arm module which is easily adjustable in the longitudinal (parallel to the propshafts) direction.

It is yet a further object of the present invention to provide a torque arm module including a torque arm which is capable of shielding the speed sensing torque transfer device and rear differential rear propshaft from excessive heat radiated by the exhaust system of the motor vehicle.

It is yet a further object of the present invention to provide a torque arm mount which allows the torque arm assembly to be adjustable in the longitudinal direction.

It is still a further object of the present invention to provide an all wheel drive system which allows the design of the rear halfshaft assemblies and the rear differential to be set at the maximum torque of the speed sensing torque transfer device.

It is yet a further object of the present invention to provide an all wheel drive system having a speed sensing torque transfer device with progressive torque transfer characteristics including a torque limiting feature to protect the rear driveline components.

It is another object of the present invention to provide an all wheel drive system including a speed dependent locking characteristic to minimize sensitivity to tire size variation, tire wear and spare tire or spare wheel usage.

It is a further object of the present invention to provide an all wheel drive system including a speed dependent locking characteristic which is located on the input shaft of the rear differential either internally or in an oil housing or externally mounted.

It is yet another object of the present invention to provide an all wheel drive system including a torque arm mount with an asymmetric configuration which is attached to the front face of the rear differential housing and the motor vehicle undercarriage to reduce the torque reaction load of the rear differential.

It is still a further object of the present invention to provide an all wheel drive system having an asymmetrical torque arm layout which provides improved packaging flexibility and reduced packaging requirements and further acts as a heat shield between the exhaust system and the temperature sensitive driveline components.

BRIEF DESCRIPTION OF THE DRAWINGS

FIG. 16 is a cross section view of a shear pump with an external actuated valve and a shear pump with a speed actuated valve.

BEST MODE FOR CARRYING OUT THE INVENTION

Figure 1:
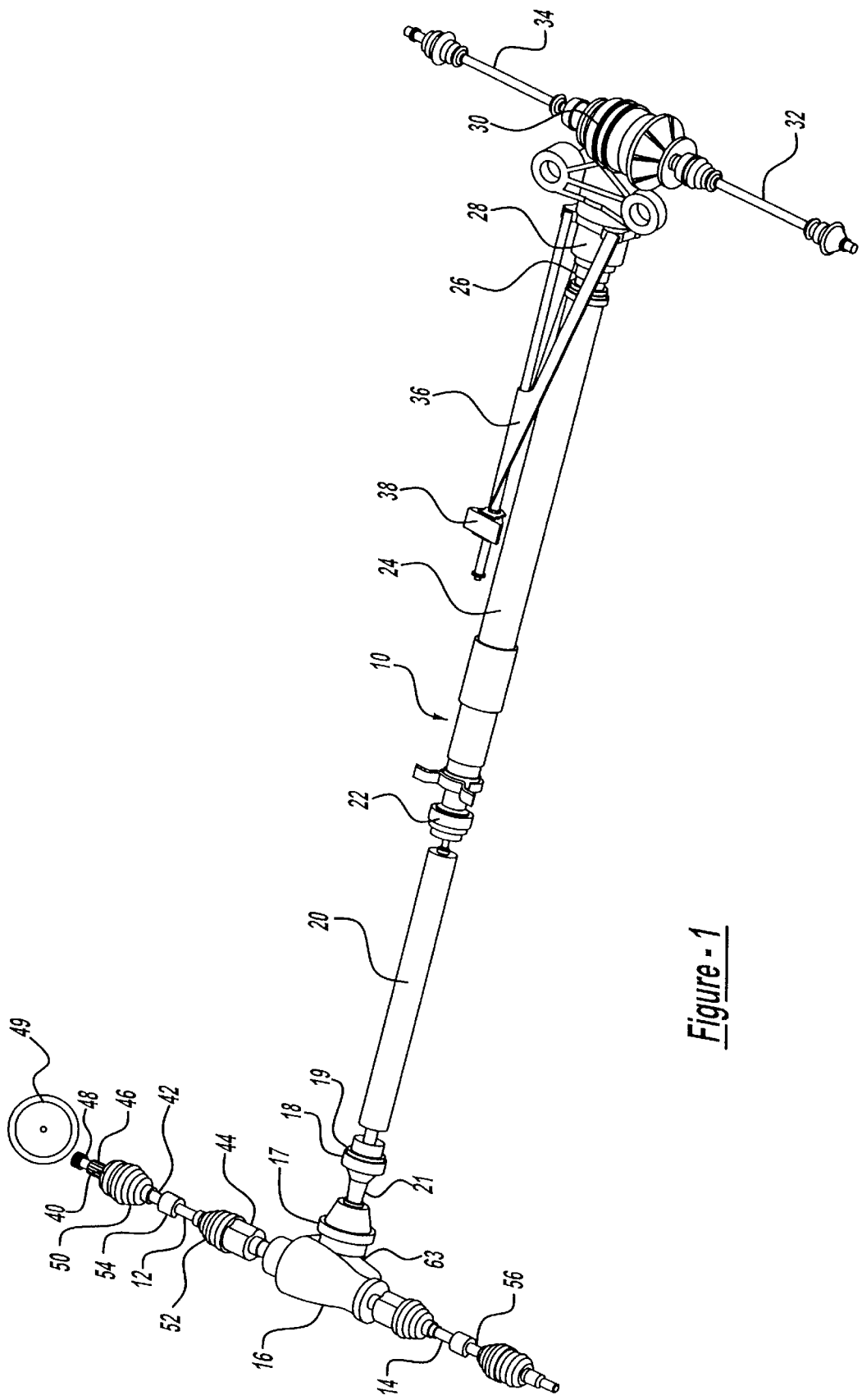
FIG. 1 is a perspective view of an all wheel drive system of the present invention.
Figure 2:
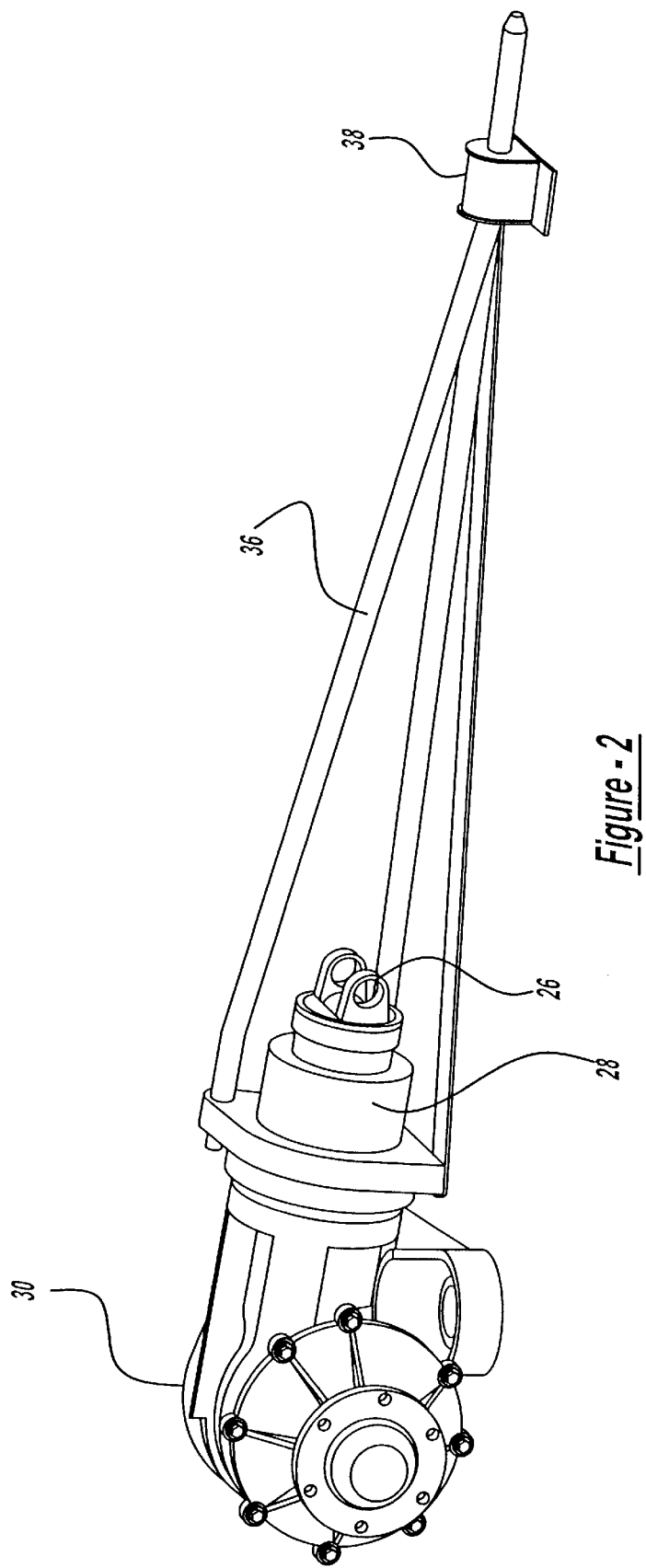
FIG. 2 is a perspective view of a differential, speed sensing torque transfer device, and one embodiment of a torque arm module of the present invention.
Figure 22:
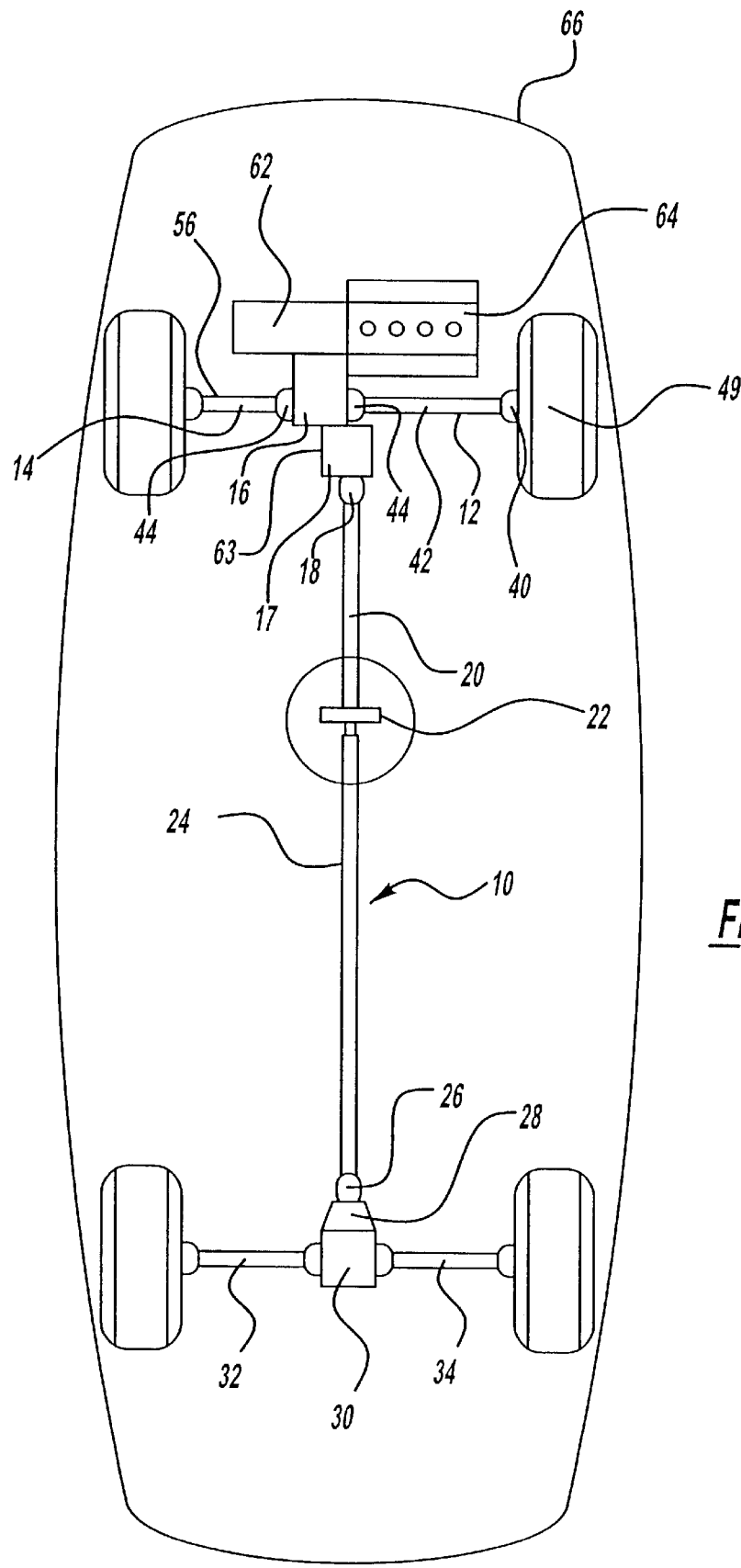
FIG. 22 is a diagrammatical depiction of the all wheel drive system of the present invention.
Figure 23:
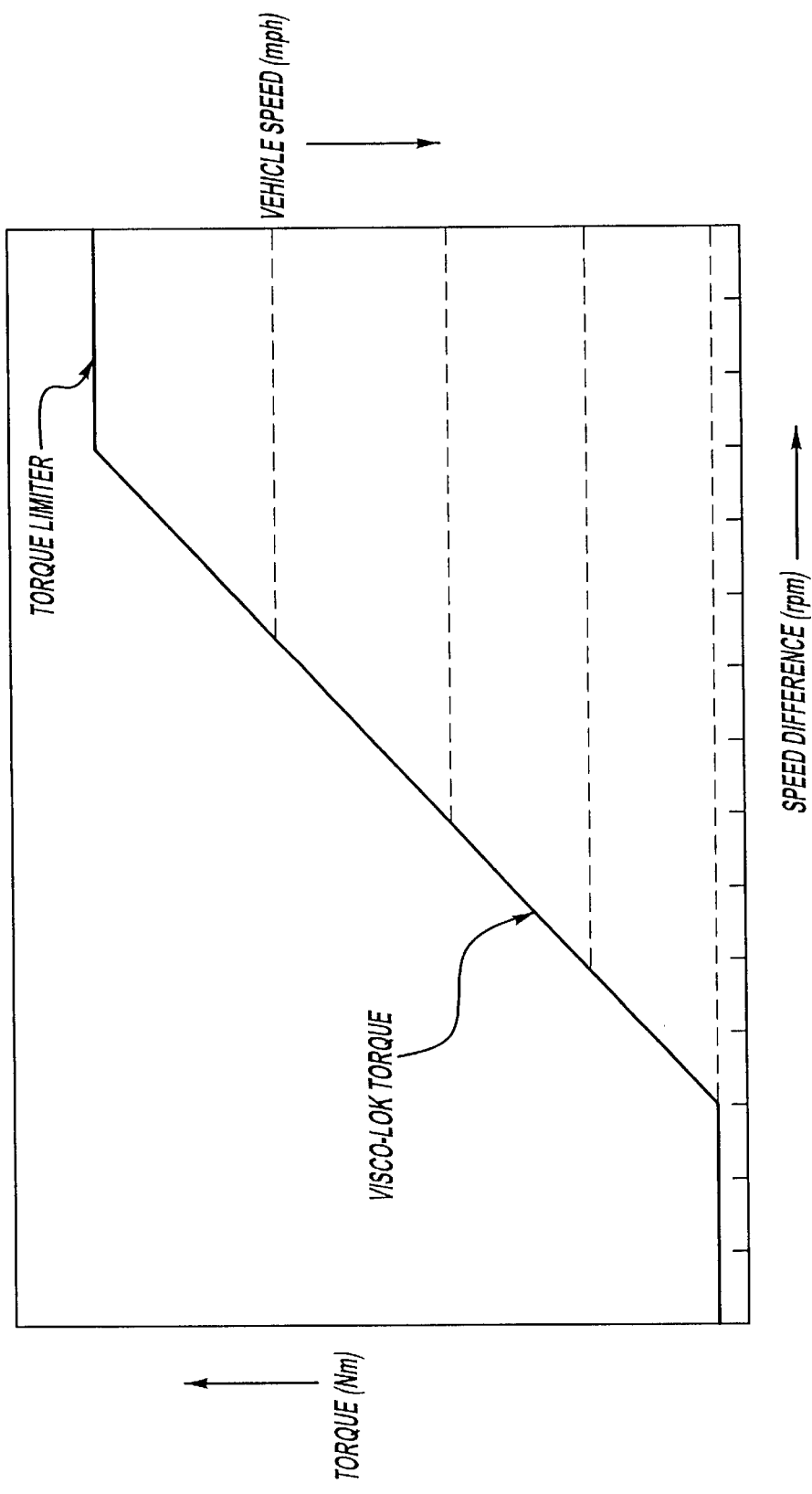
FIG. 23 is a graph depicting the relationship between the torque speed differential and vehicle speed.

Referring to FIGS. 1 and 22, there is shown generally by reference numeral 10 the all wheel drive system of the present invention. The all wheel drive system comprises a pair of front halfshaft assemblies designated as reference numerals 12 and 14 respectively. The front halfshaft assemblies 12 and 14 are operatively connected to a front differential 16. Connected to front differential 16 is a power take-off unit 17. The power take-off unit 17 is operatively connected to a high speed fixed joint 18. Operatively connected to high speed fixed joint 18 is a front propshaft assembly 20. Operatively connected to front propshaft assembly 20 is a "VL" style plunging constant velocity joint designated as reference numeral 22.

Connected to "VL" style plunging constant velocity joint 22 is rear propshaft assembly 24. Rear propshaft assembly 24 is connected at one end to cardan joint assembly 26. Cardan joint assembly 26 is operatively connected to the speed sensing torque transfer device of the present invention designated as reference numeral 28. Speed sensing torque transfer device 28 is operatively connected to rear differential assembly 30. A pair of rear halfshaft assemblies 32 and 34 are each connected to rear differential assembly 30. As shown in FIG. 1, attached to the rear differential assembly 30 is torque arm 36. Torque arm 36 is further connected to torque arm mount 38.

Front halfshaft assemblies 12 and 14 are comprised of fixed constant velocity joints 40, a interconnecting shaft 42 and a plunge style constant velocity joint 44. Plunge style constant velocity joints 44 are operatively connected to the front differential 16. Plunge style constant veloity joints 44 are plug-in style in this embodiment. It is contemplated in the present invention that any style of constant velocity joint halfshaft assembly could be used in the present invention as it relates to different types and styles of constant velocity joints such as plunging or tripod style constant velocity joints, angular articulation or AAR constant velocity joints and other various types of fixed constant velocity joints. As is shown in FIG. 1, the stem portion 46 is splined such that it interacts with a front wheel of a motor vehicle and has a threaded portion 48 which allows connection of the wheel 49 to the halfshaft assembly 12. Wheel 49 is also shown in FIG. 22.

There is also shown in FIG. 1 constant velocity joint boots 50 and 52 which are known in the art and are utilized to contain constant velocity joint grease which is utilized to lubricate the constant velocity joints. There is also shown a dynamic damper 54 which is known in the art. U.S. Pat. No. 5,660,256 to the assignee of the present invention is herein incorporated by reference and utilized for specific details with respect to design and operation of dynamic dampers. Halfshaft assembly 14, according to the present invention, would be designed generally similar to that of halfshaft assembly 12 with the only changes being the length of the interconnecting shaft 56. It is also known to utilize different sizes and types of constant velocity joints on the left or right side of the drive system depending on the particular application.

The power take-off unit 17 of the present invention is shown in FIGS. 1 and 22. The power take-off unit 17 is mounted to the face of the transmission 62 and receives torque from the front differential 16. The transmission 62 is operatively connected to the engine 64 of the motor vehicle 66. The power take-off unit 17 has the same gear ratio as the rear differential 30 and drives the front propshaft 20 through the high speed fixed joint 18 at 90 degrees from the front differential axis.

Speed Sensing Torque Transfer Device

There is an increasing demand for simple, self-controlling, speed-sensing limited-slip devices with progressive locking characteristics and high torque capacity, in particular in Sport Utility Vehicle and light truck axle and transfer case applications. Existing speed-sensing systems mostly have a degressive locking characteristic curve; other designs are too complex for high volume production. Torque-sensing Limited-Slip Differentials (LSD) that are fully ABS-compatible sometimes provide an insufficient locking effect under extreme Surface conditions.

Figure 14:
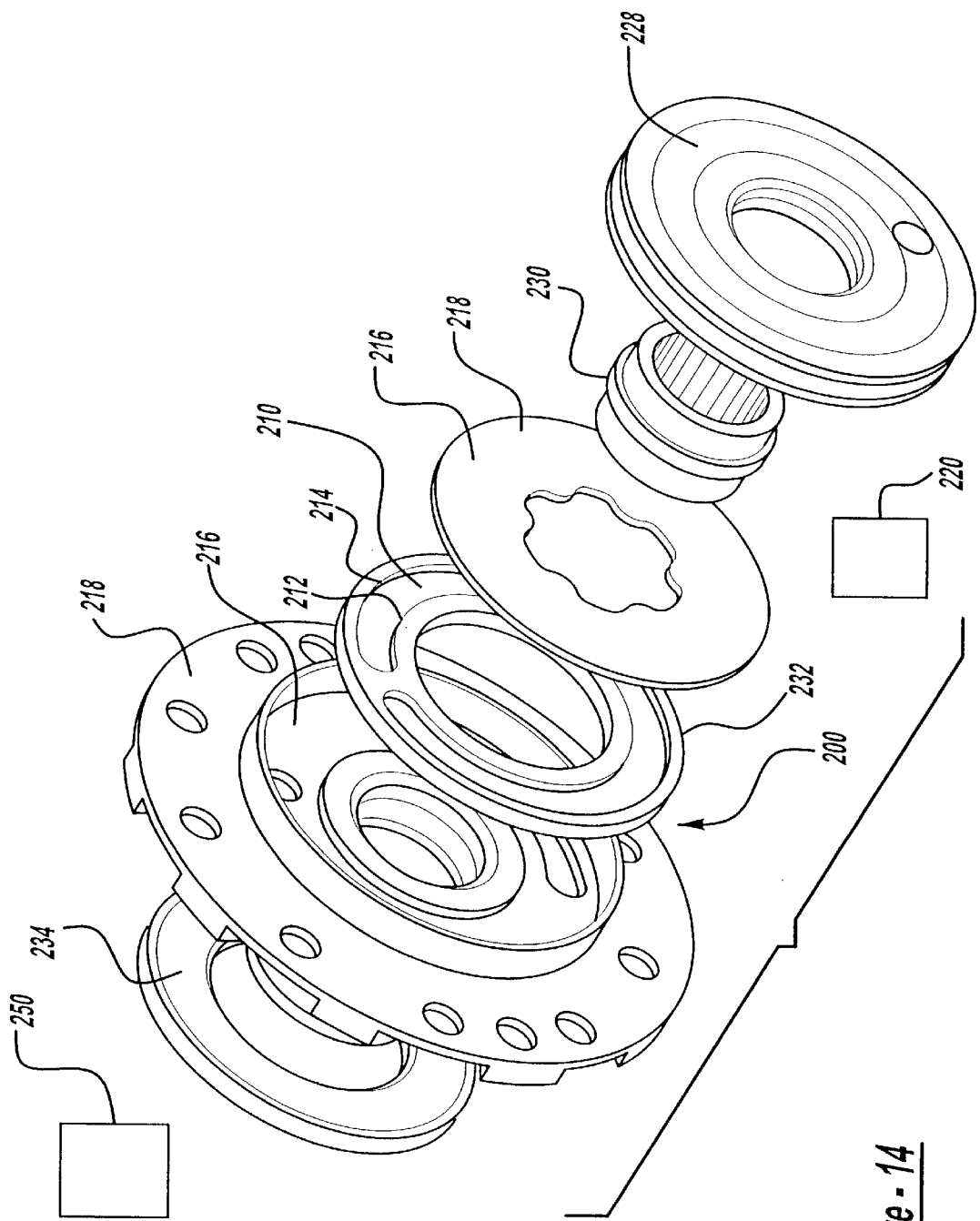
FIG. 14 is an exploded view of the shear pump of the speed sensing torque transfer device.
Figure 15:
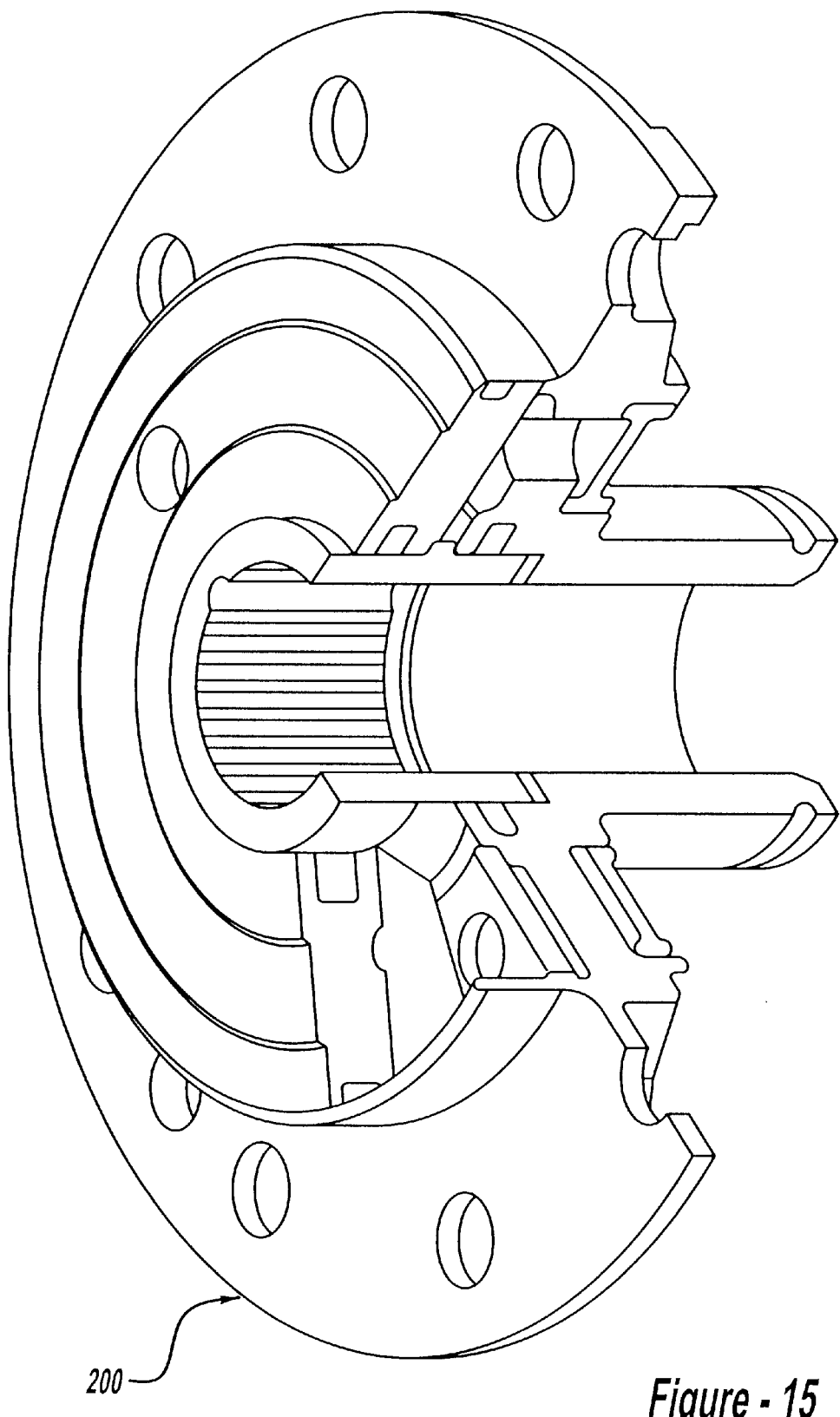
FIG. 15 is a cross section of the shear pump.

Speed sensing torque transfer device 28 is a new speed-sensing limited-slip device with high-torque progressive engagement and is tuned to minimize driveline windup. Device 28 allows a wide range of calibration in specifying the level of torque transfer at any particular speed difference. Referring to FIGS. 14 and 16, device 28 is a self-controlling stand-alone system which consists of a unique shear pump 200 which creates a pressure proportional to a speed difference, which engages a friction clutch 202 to transmit the torque. As shown in FIGS. 13–19 shear pump 200 is self-contained and independent, requiring no external source of hydraulic fluid. Shear pump 200, which is filled with silicone fluid, provides significant benefits in packaging, temperature stability, durability, and weight. By simple mechanical means, various torque characteristics ranging from degressive to progressive are realized to optimize both traction and handling. Asymmetrical characteristics are possible with maximum additional effort. As shown in FIG. 16, device 28 can be switched off by simple speed-actuated valve 204 or an externally controlled valve 206. Device 28 can be used as a differential biasing device in conjunction with an open differential or as an "on-demand" torque transfer between the axles of the vehicle, resulting in the system as a basis for a comprehensive limited-slip system.

Device 28 is comprised of two distinct functional parts, a shear pump 200 and a friction clutch 202. The ability to separate the controlling function from the locking function provides significant flexibility in specifying the torque characteristic at any particular speed difference. Friction clutch 202 provides high power density and reliability. The established requirements for the pump unit are, a closed stand-alone system independent of external control and oil source, a high pressure capacity to exploit the friction clutch capability, simple design with high reliability to achieve low costs and long lifetime, and a low temperature dependency to avoid complex compensation mechanisms.

Shear pump 200 generates a pressure proportional to a speed difference, which engages the friction clutch 202 via the piston 228 to transmit torque. Conventional types of friction or clutch plates 86 utilized in wet clutches are selected in accordance with the specific application requirements, i.e., torque capacity, power density, NVH issues.

The pressure generation in the shear pump 200 is based on shearing a high viscosity silicone fluid in a laterally sealed shear channel 210, shown in FIG. 14. Shear channel 210 consists of a pumping groove 212 located in a plate 214 and a flat surface 216 of a second plate 218 with relative movement to one another. Pumping groove 212 is filled with a high viscosity fluid 220. For explanation, one surface is compared to a conveyor belt, shown diagrammatically in FIG. 13, which pulls the viscous fluid 220 through the shear channel 210 by the relative speed direction from the beginning of the sealed channel suction side 222 to the end pressure side 224.

With the suction side 222 connected to a reservoir 226 and the pressure side 224 to a piston 228, the conveyor belt generates a fluid flow from reservoir 226 to the piston 228.

The generated pressure and volume flow is approximately proportional to the relative speed and is a function of fluid viscosity and geometry of the shear channel. Transferring this linear model into a rotating system, shown in FIG. 14, the conveyor belt becomes a second plate 218 fixed to the hub 230 and the channel becomes pumping groove 212 on pump disc 232 fixed to the housing 250. Pump disc 232 includes pumping groove 212 and connecting holes 300 and 302 forming shear channel 210 in conjunction with flat surface 216. Shear pump 200 is covered by a spring-loaded compensation piston 234 on the opposite side of the housing 250.

Figure 17:
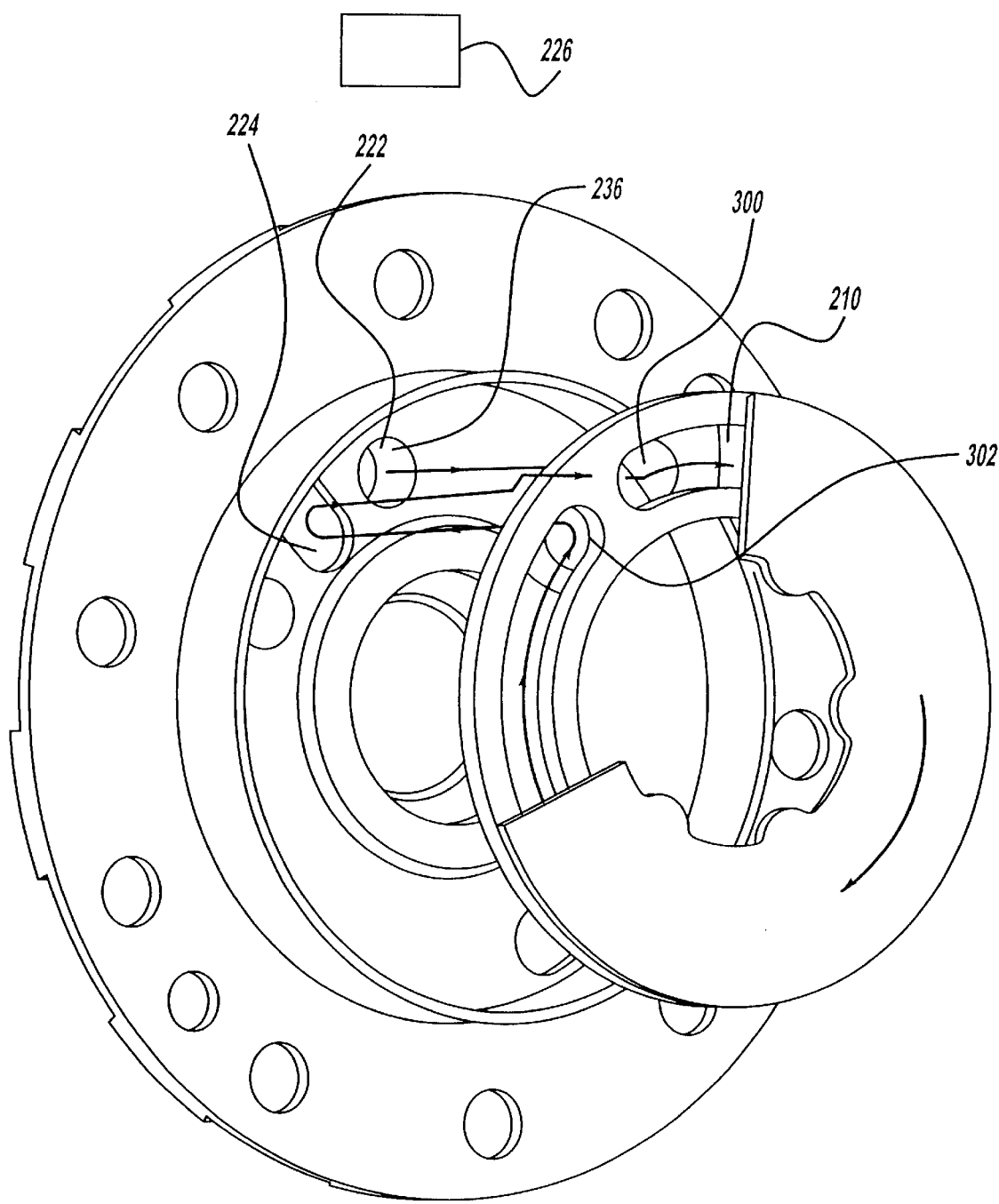
FIG. 17 is a perspective view of a shear pump.

The arrows in FIG. 17 illustrate the fluid flow from the reservoir 226 to the piston 228 when a relative speed difference occurs across the shear pump 200 (between pump disc 232 and plate 214). As in the conceptual model illustrated in FIG. 13, the fluid is drawn out from the reservoir 226 via the connecting hole 236, then moved through the shear channel 210 due to the shear forces, and directed between plate 214 and piston 228. The generated pressure forces piston 228 against the friction clutch 202 as well as forcing plate 214 against pump disc 232 assuring a tight seal. Due to this self-sealing effect there is no need for a complex sealing design.

A unique feature of the shear pump is, that it is self-contained and independent, requiring no external source of hydraulic fluid or servicing. The system can be internally or externally mounted and provides significant benefits in packaging, durability, and weight compared to conventional vane type or gerotor type pump systems. Shear pump 200 is filled with high viscosities silicone fluid. The physical properties of the silicone fluid provide superior temperature stability, minimal temperature sensitivity, and excellent durability.

Although, the main feature of the shear pump 200 is its stand-alone capability, there are opportunities to further influence its operation. By connecting the pressure side 224 and suction side 222, it can be switched off by a simple speed-actuated valve 204 or externally actuated valve 206, as shown in FIG. 16. The maximum pressure and consequently the maximum locking torque can be limited by a conventional pressure liming valve. For a further understanding of speed sensing torque transfer devices please see U.S. Pat. No. 5,526,912 to GKN Automotive AG and U.S. Pat. No. 5,562,191 also to GKN Automotive AG, such patents which are herein incorporated by reference.

Having described some of the general characteristics of the all wheel drive system, attention will now be turned to the specific elements of the system.

In the current all wheel drive system, an internal combustion engine 64 is operatively connected to a front wheel drive transmission system 62 shown in FIG. 22. As can be seen from FIG. 22, front halfshaft assemblies 12 and 14 are operatively connected to transmission system 62. More specifically, transmission system 62 includes a front differential 16 as is known in the art which includes some means for receiving the plunging constant velocity joints 44 of the front halfshaft assemblies. Internal to the transmission 62, the front differential housing 63 is operatively connected to the power take-off unit 17 shown in FIG. 22. The power take-off unit 17 is further connected to a high speed fixed joint 18.

Figure 3:
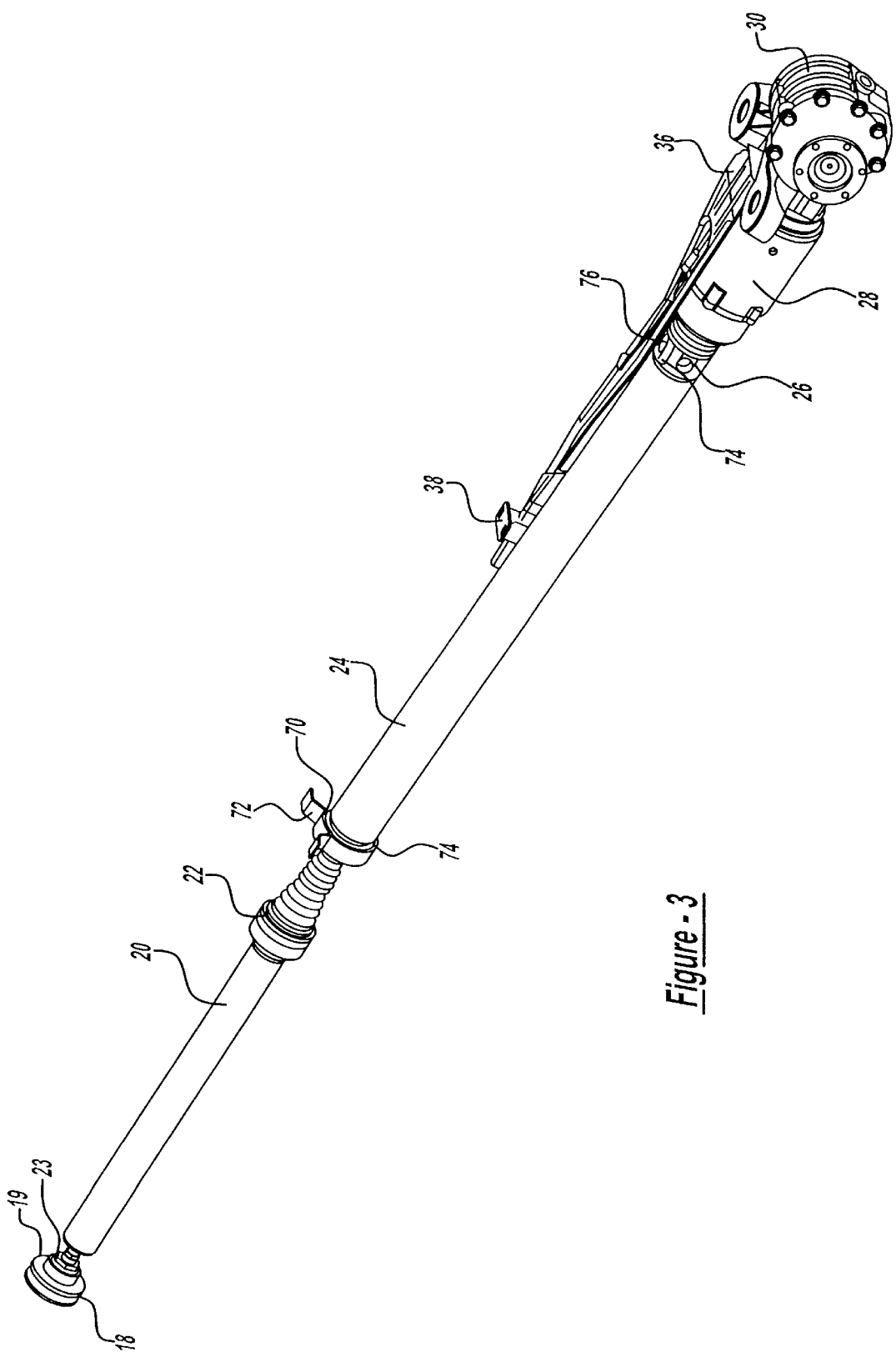
FIG. 3 is a perspective view of a differential, speed sensing torque transfer device, torque arm module, rear propshaft assembly, center bearing assembly, plunging constant velocity joint, front propshaft assembly and high speed constant velocity joint of the present invention.

As seen in FIGS. 1 and 22, high speed fixed joint 18 is connected at one end to the power take-off unit 17 and at the other end to a front propshaft 20. The high speed fixed joint has an revolution-per-minute (RPM) capacity of 6000 RPMs with a best mode of 3000–5000 RPMs, a torque capacity of 5–1500 Nm with a best mode of 600–700 Nm, and an angle capacity of up to 15 degrees with a best mode of 3–6 degrees. The present invention contemplates use of other constant velocity joints and/or cardan joints or universal joint technology at this connection but the preferred embodiment of the present invention is high speed fixed joint as described above. As shown in FIG. 3, high speed fixed joint 18 includes a boot 23 which is utilized to enclose grease (not shown) required for lubrication of the high speed fixed joint 18.

Figure 4:
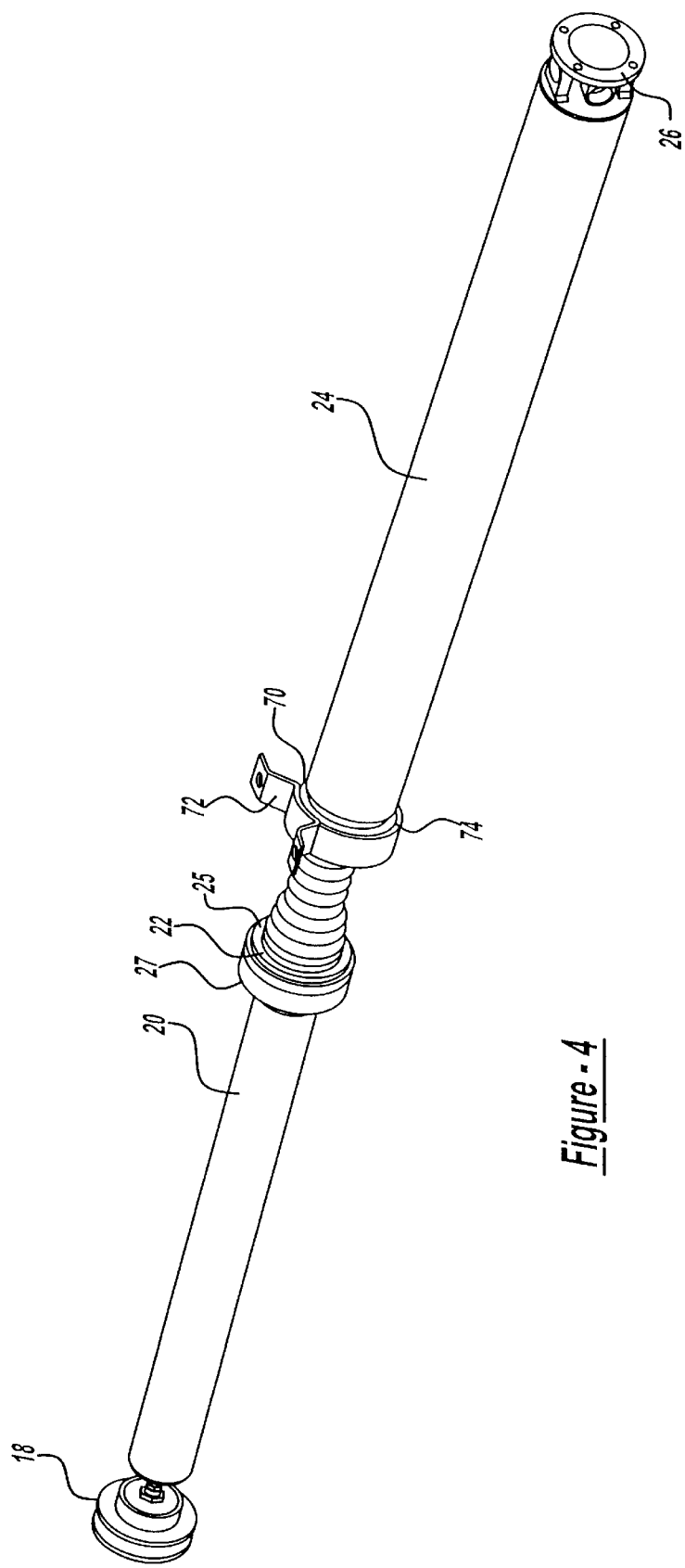
FIG. 4 is a perspective view of the rear propshaft assembly, center bearing assembly, plunging constant velocity joint, front propshaft assembly and high speed constant velocity joint of the present invention.
Figure 20:
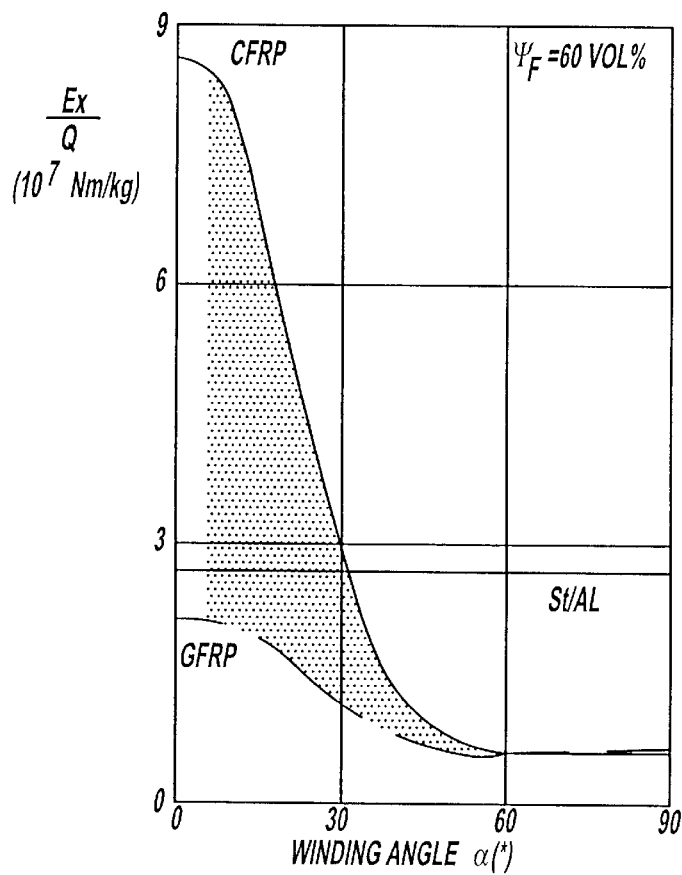
FIG. 20 is a graph depicting winding angle versus youngs modulus.
Figure 24:
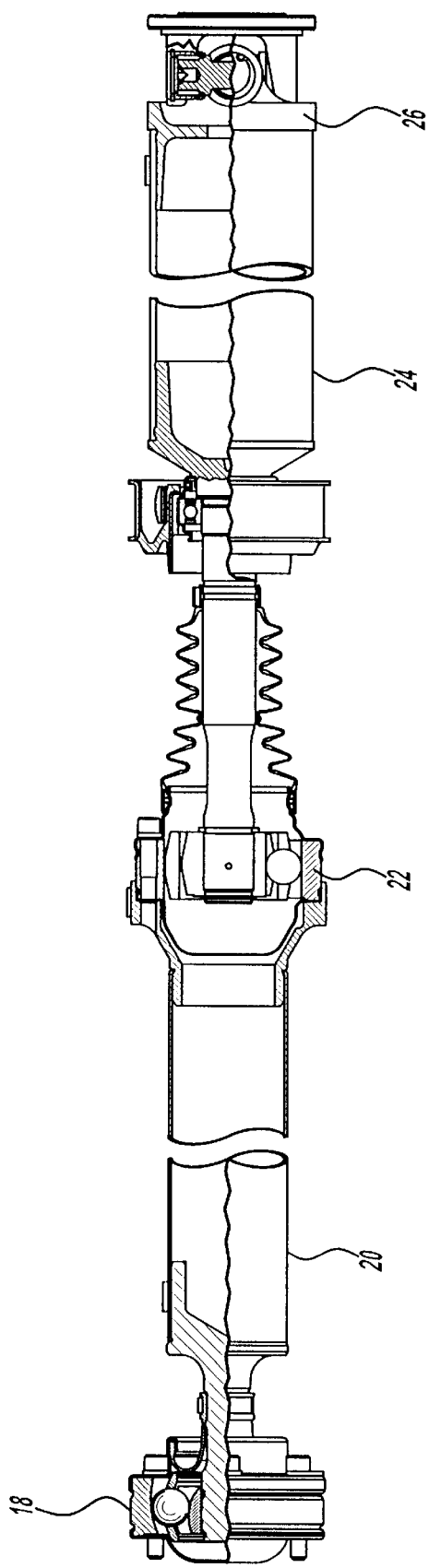
FIG. 24 is a partially cross sectional view of the high speed fixed joint, front propshaft, plunging style VL constant velocity joint, center bearing assembly, rear propshaft and cardan joint assembly.
Figure 26:
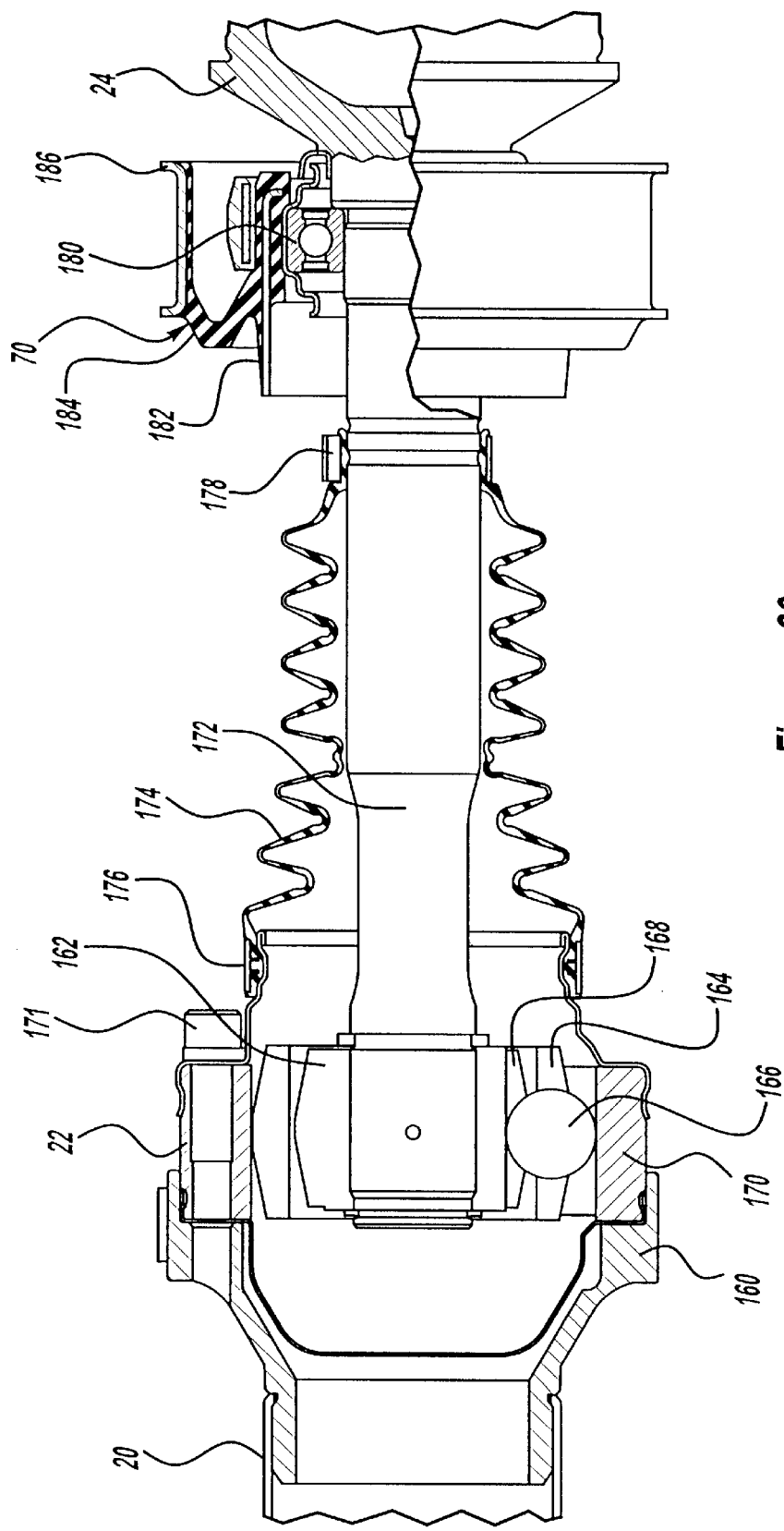
FIG. 26 is an enlarged partially cross sectional view of the plunging style VL constant velocity joint, center bearing assembly and rear propshaft.

As shown in FIGS. 3 and 4, the front propshaft 20 in the present invention is manufactured from steel providing a very low run-out and critical speed capacity higher than the second engine order. Front propshaft 20 is operatively connected to constant velocity joint 22 by fasteners 25 as in FIG. 4. Front propshaft 20 has a flange 27 extending out which is connected to constant velocity joint 22 by fasteners 25. It is again contemplated by the present invention that this constant velocity joint could be of various types but a constant velocity joint providing a torque characteristic of 6000 RPMs, with a best mode of 3000–5000 RPMs, a torque capacity in a range of 5–1500 Nm, with a best mode of 600–700 Nm, an angle characteristic in a range of 6–10 degrees and a best mode of 8 degrees. An amount of plunge capacity is also required in a range from 0 to 60 millimeters with a best mode of 40 to 55 millimeters. It is the preferred embodiment of the present invention to use a VL type plunging constant velocity joint as shown in FIGS. 3 and 4. The VL or cross groove constant velocity joint is shown in FIG. 26. Rear propshaft 24 is manufactured from a composite material generally carbon re-enforced plastic material with a thermosetting epoxy matrix (Bisphenol A). As shown in the attached diagram, the rear propshaft of the present invention should have a torsional characteristic related to g-modulus and youngs modulus in the x direction as the function of the winding angle as shown in FIGS. 20 and 24. The present invention contemplates an Ex/q ratio in a range greater than steel and aluminum and preferably greater than 3 as shown in FIG. 20 as the darkened shaded area under the curve. Referring to FIG. 20, Ex equals the longitudinal stiffness of the rear propshaft. Longitudinal stiffness is derived by dividing the load in newtons over the cross sectional area in square meters of the propshaft multiplied by the change in length of the propshaft while the propshaft is under load.

$$Ex = \frac{\text{Load (newtons)}}{\text{Area (meters}^2)} \Delta L$$

The change in L equals the length final (LF) minus the length initial (LI) divided by the length initial (LI).

$$\Delta L = \frac{LF - LI}{LI}$$

Specifically, pulling on either end of the propshaft will provide a deflection of a certain amount. LF is the length of the propshaft under load. LI is the initial length of the propshaft with the change in L being the difference between LF and LI.

Referring back to FIG. 20, q represents density. Density is measured in kilograms per meter cubed or K/M³.

$$q = \frac{K}{M^3}$$

The ratio Ex/q then determines the longitudinal stiffness of a particular propshaft over its density. With respect to steel and aluminum, it would be noted that it provides a relatively high longitudinal stiffness but also has a very high density thereby providing a lower ratio.

In FIG. 20, CFRP represents a carbon fiber reinforced propshaft. GFRP represents a glass fiber reinforced propshaft. 60% volume represents the percentage fibers by volume. 60% on the graph represents a certain percentage of the propshaft that is fiber and a certain percentage that is a resin. 60% volume represents 60% fiber per unit volume with 40% resin as the other portion per unit volume. Under current manufacturing standards 60% fiber by volume is the best ratio available.

Figure 21:
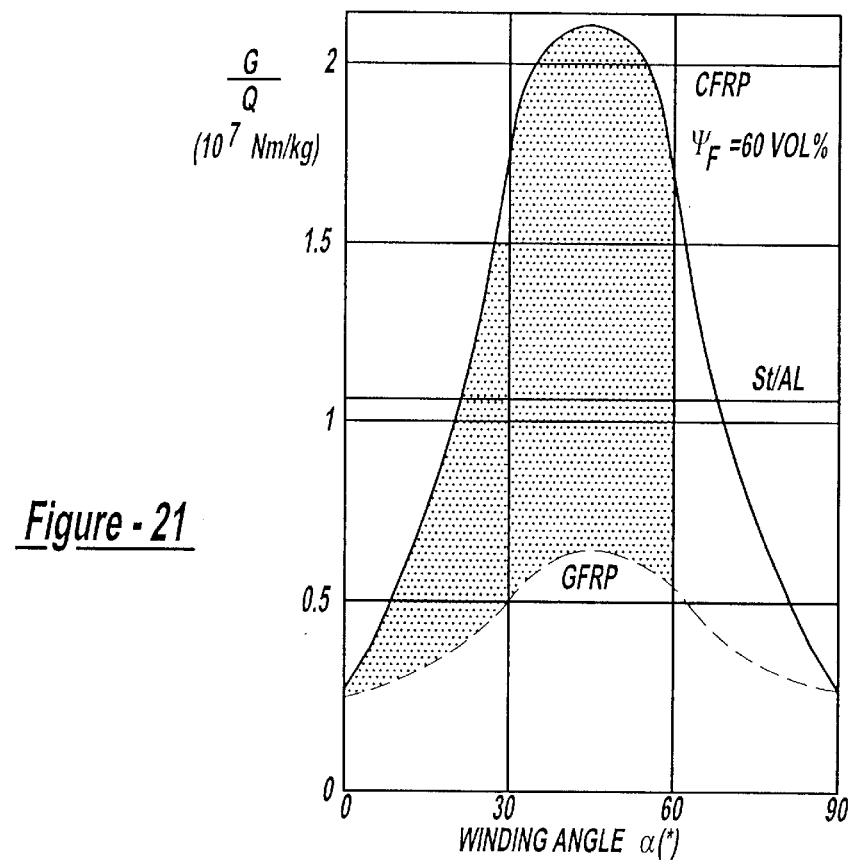
FIG. 21 is a graph depicting winding angle versus g-modulus.

Rear propshaft 24 of the present invention is currently 25% glass and 75% carbon. FIG. 21 is essentially similar to the FIG. 20 except G represents torsional stiffness. Winding angles on the graphs represent, in the X-direction the fibers having a zero angle if they are parallel to the X axis and having a 90 degree angle if set completely perpendicular to the x axis.

Figure 11:
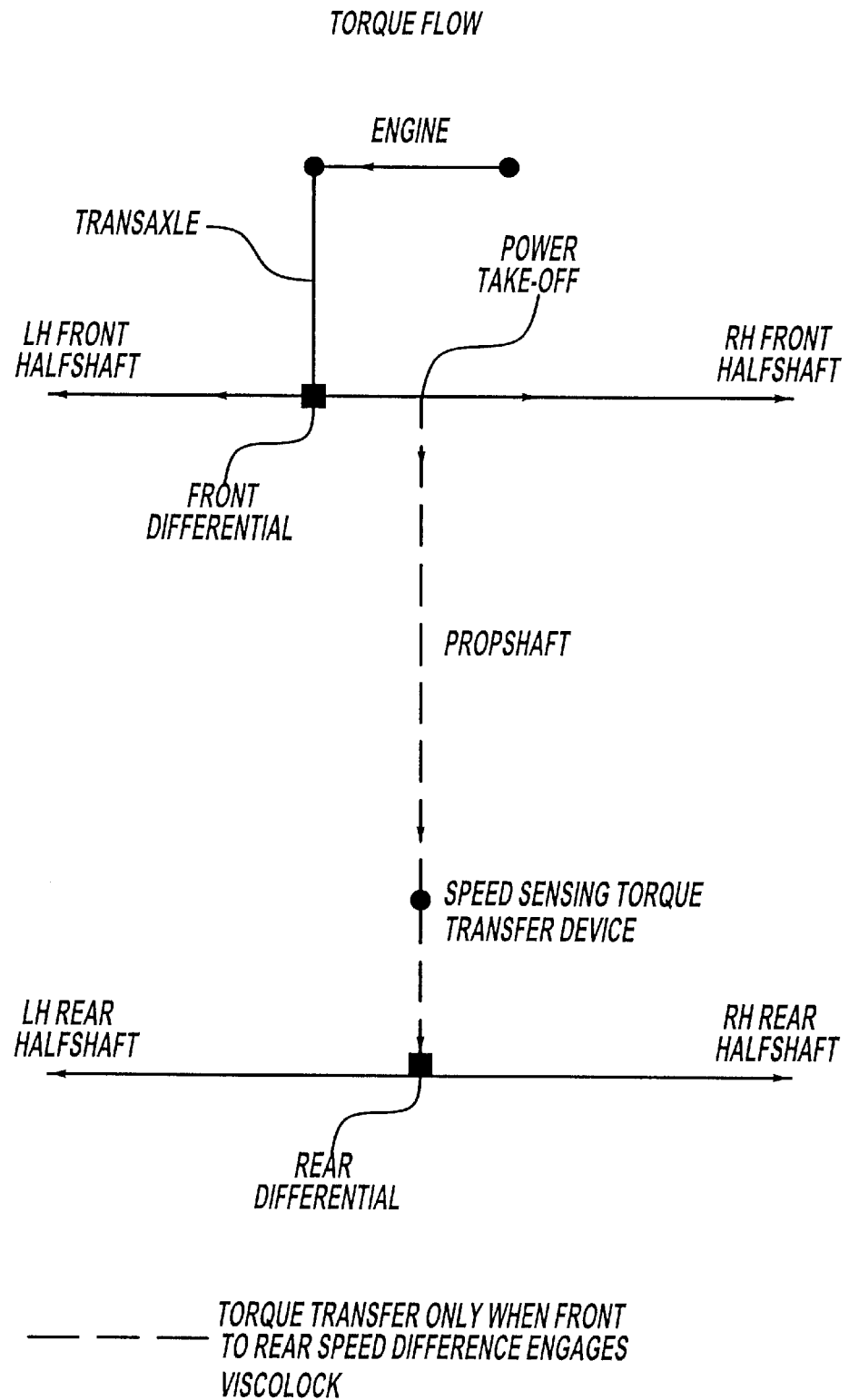
FIG. 11 is a flow chart depicting the torque flow of the all wheel drive system of the present invention.
Figure 12:
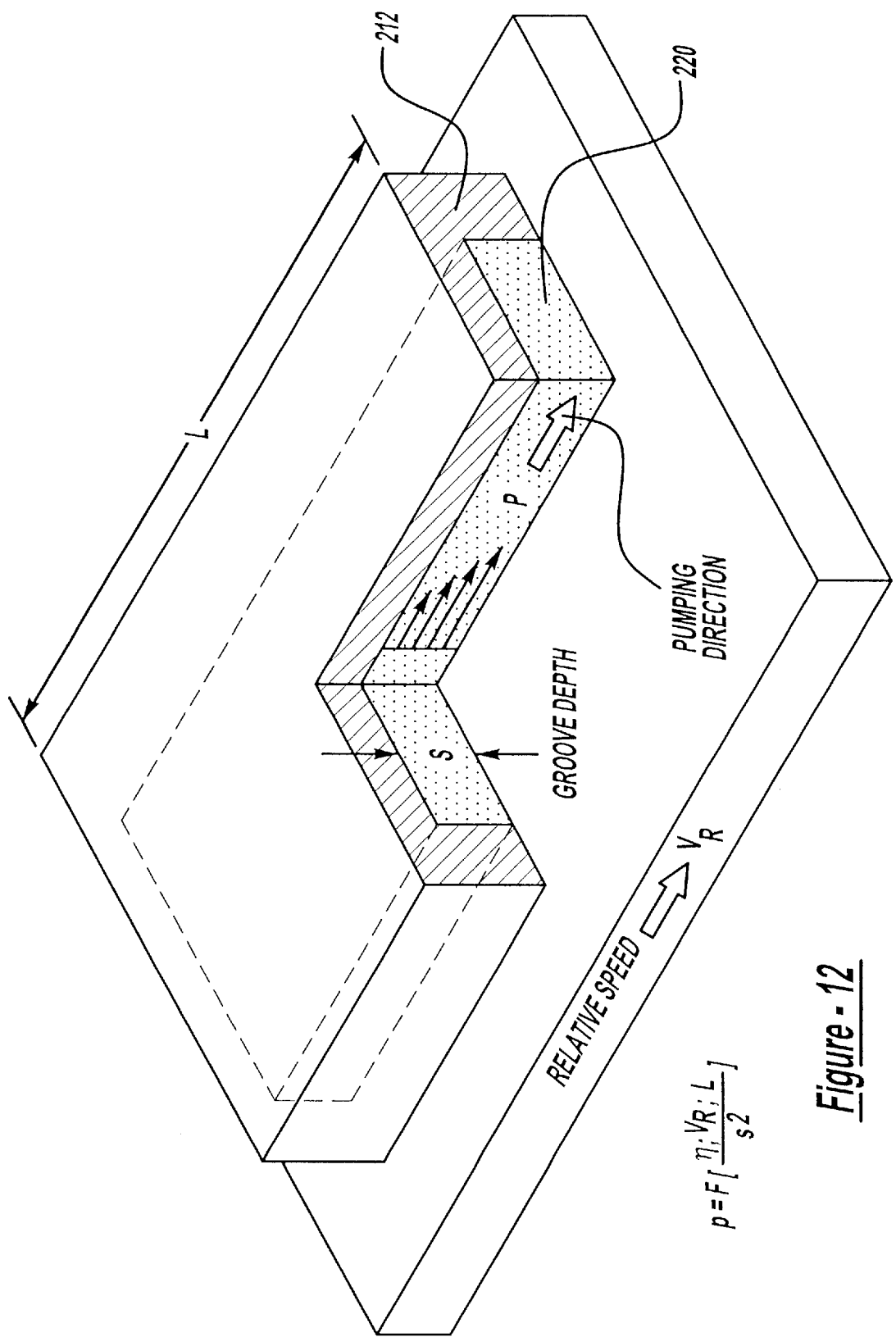
FIG. 12 is a shear pump fluid dynamics diagram.
Figure 13:
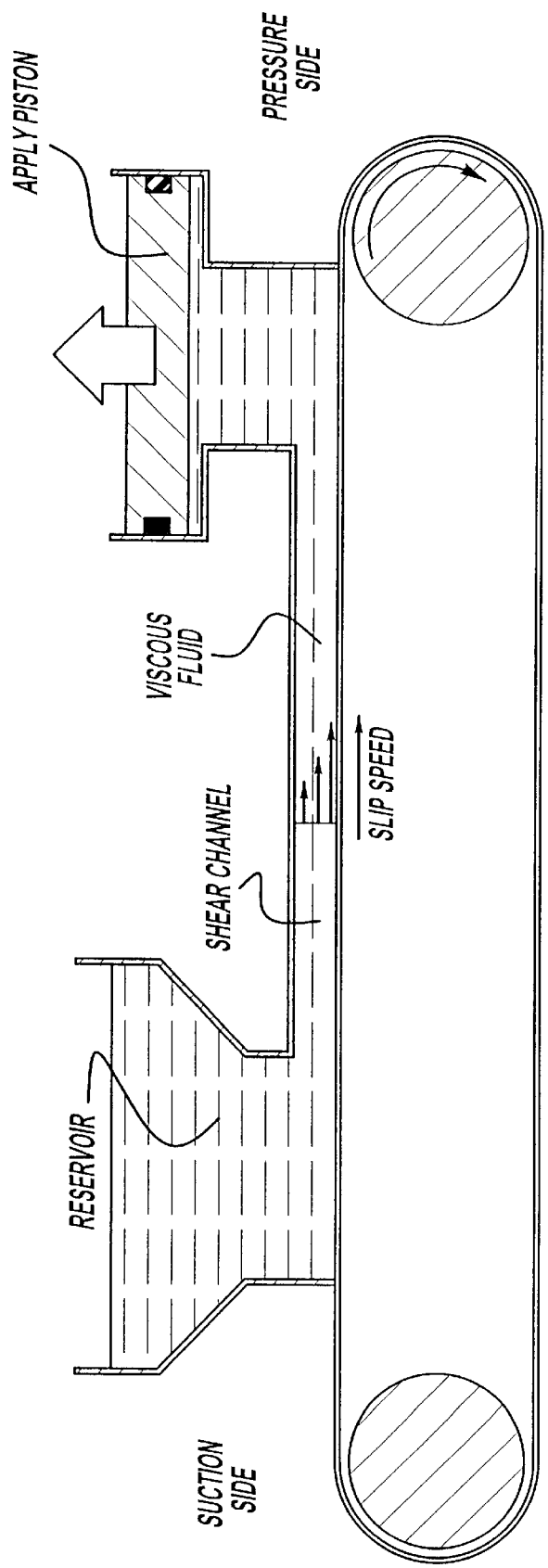
FIG. 13 is a conceptual model of the shear pump of the sensing torque transfer device.

Referring now to FIGS. 3 and 4 the center bearing assembly 70 is shown supporting the rear propshaft 24 and constant velocity joint 22 connection. Center bearing assembly 70 includes a bracket 72 and a bearing system 74 which is utilized to support the rear propshaft 24 while allowing rotational movement of the rear propshaft 24. It is understood that the center bearing assembly 70 must withstand an RPM of 3000–6000 RPMs while still being able to operatively support the system. Rear propshaft 24 includes a cardan joint 26. Cardan joint 26 connection has a first member 74 which is attached to the rear propshaft and a second connection member 76 which is operatively connected to the speed sensing torque transfer device 28. As shown in FIG. 11, torque is transmitted from the rear propshaft 24 through the cardan joint 26 and to the internal working components of the speed sensing torque transfer device 28 as previously described.

Figure 19:
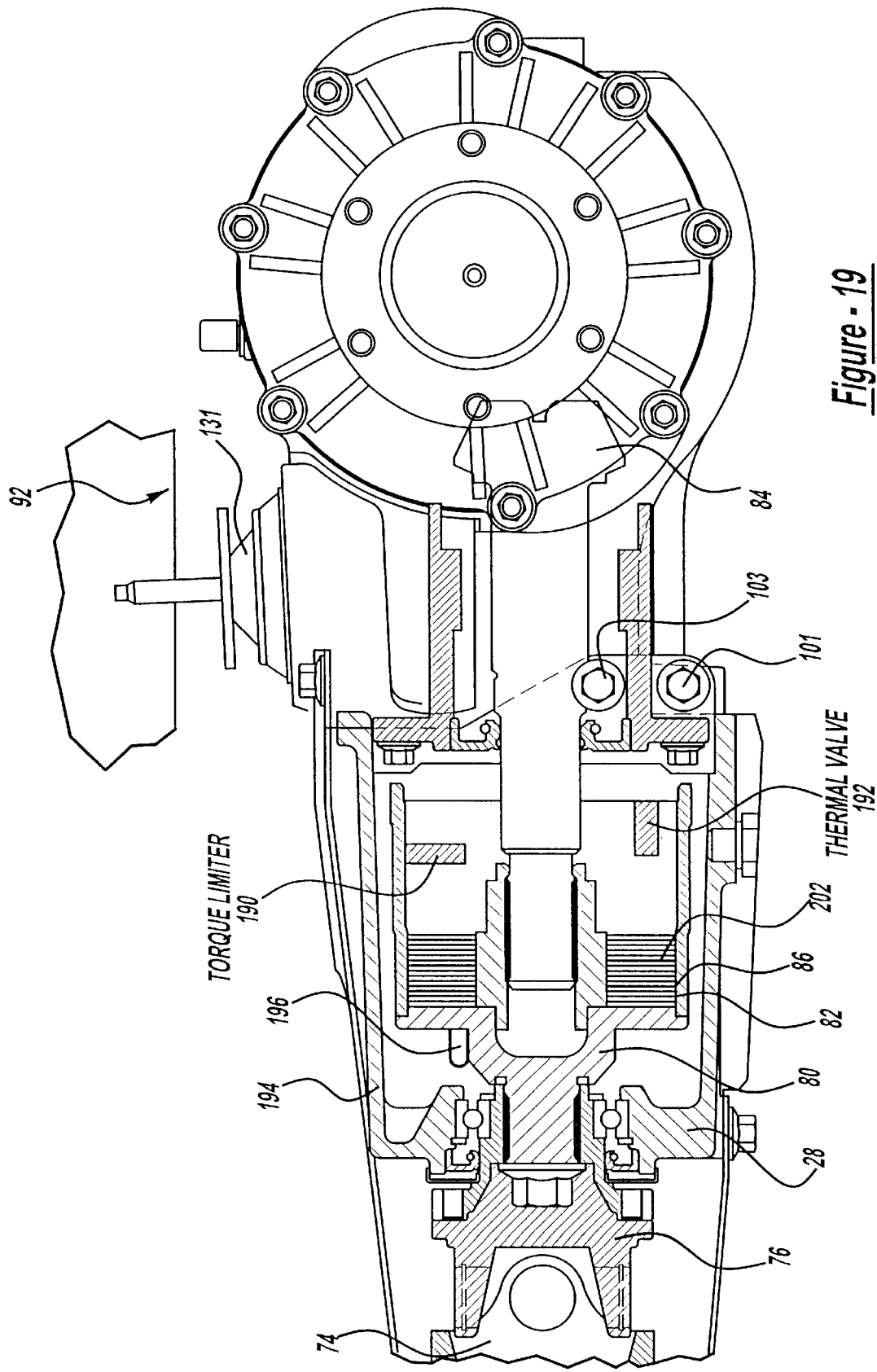
FIG. 19 is a partially cross sectional view of a cardan joint, an alternative embodiment of the speed sensing torque transfer device and differential of the present invention.

Referring to FIG. 19, torque is transferred from first connection member 76 through member 80 into the first set of clutch plates 82. Working from the opposite end of the open differential, the pinion gear 84 is in turn connected to a second set of clutch plates 86 as also shown in FIG. 16 described previously. When a speed difference is reached between first set clutch plates 82 and second set of clutch plates 86, the speed sensing torque transfer device 28 senses the speed differential as described previously and the shear pump 200 (shown in FIGS. 13–17) is engaged to begin transferring torque from the rear propshaft 24 through the speed sensing torque transfer device 28 via member 80 through the first set of clutch plates 82 to the second set of clutch plates 86 through the pinion gear 84 through to the rear differential gears (not shown) and finally out to the rear halfshaft assemblies 32 and 34.

Figure 5:
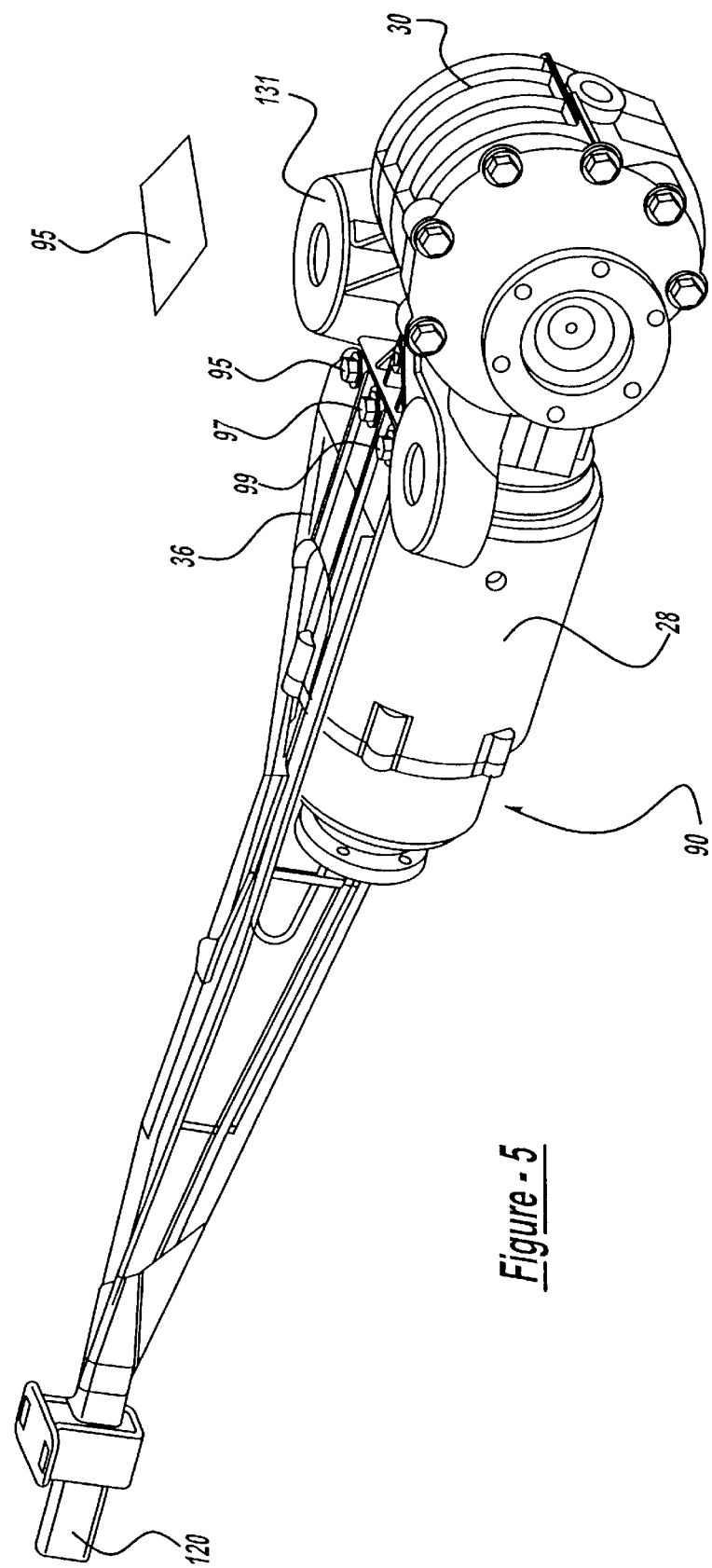
FIG. 5 is a perspective view of the differential, speed sensing torque transfer device, torque arm and torque arm mounting assembly of the present invention.
Figure 6:
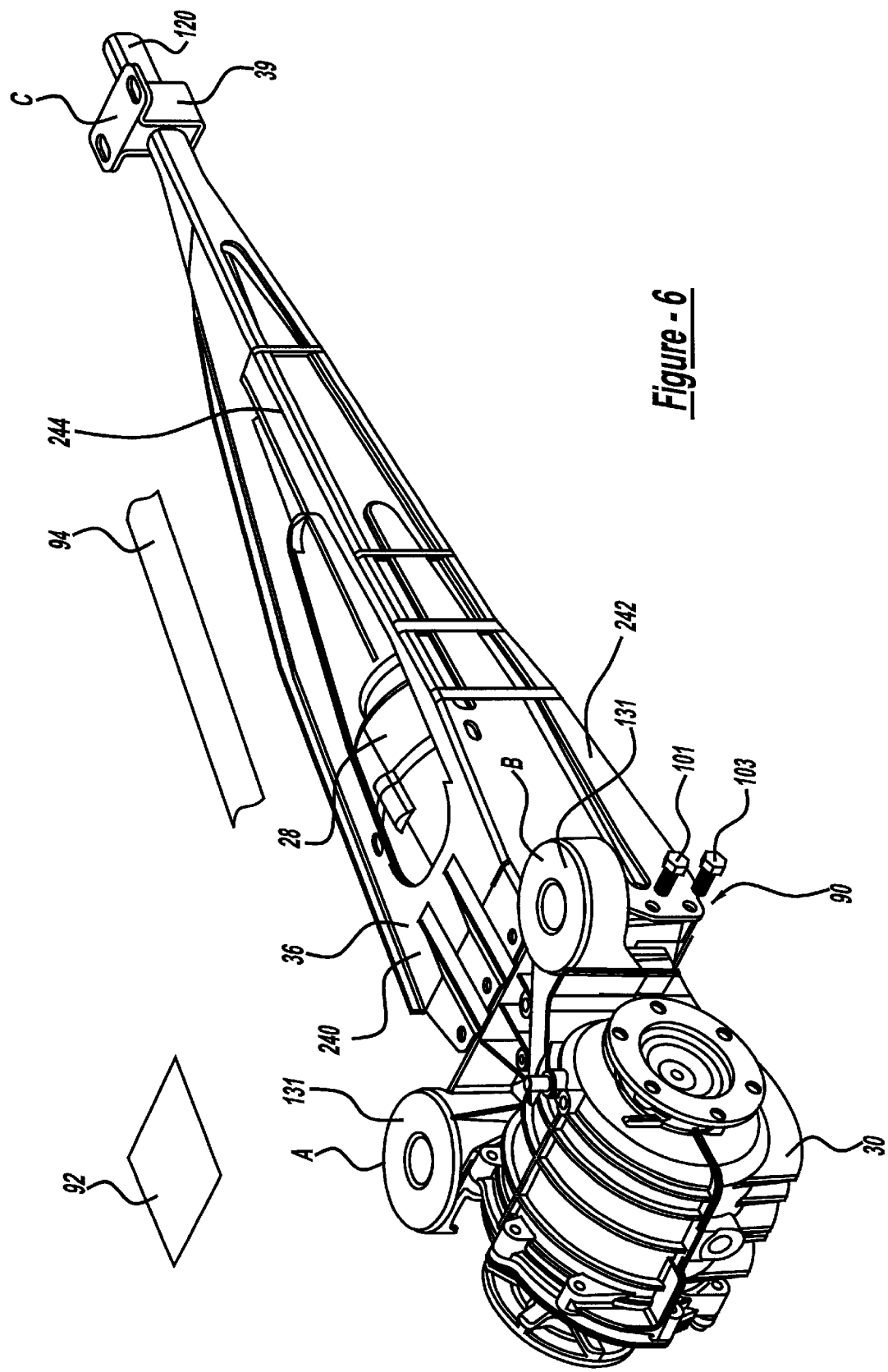
FIG. 6 is an alternative perspective view of the differential, speed sensing torque transfer device, torque arm and torque arm mounting assembly of the present invention.
Figure 7:
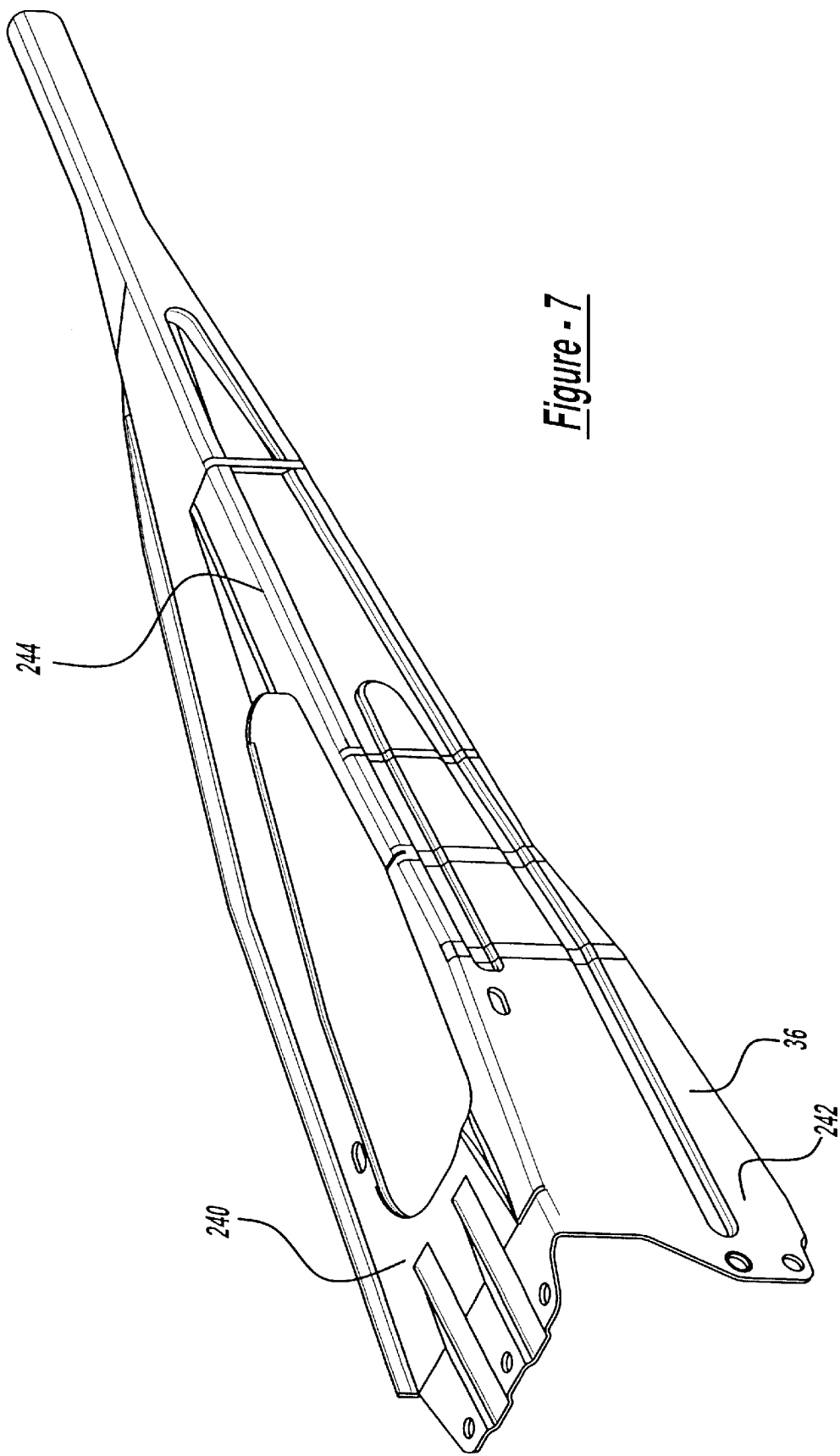
FIG. 7 is a perspective view of the torque arm of the present invention.
Figure 8:
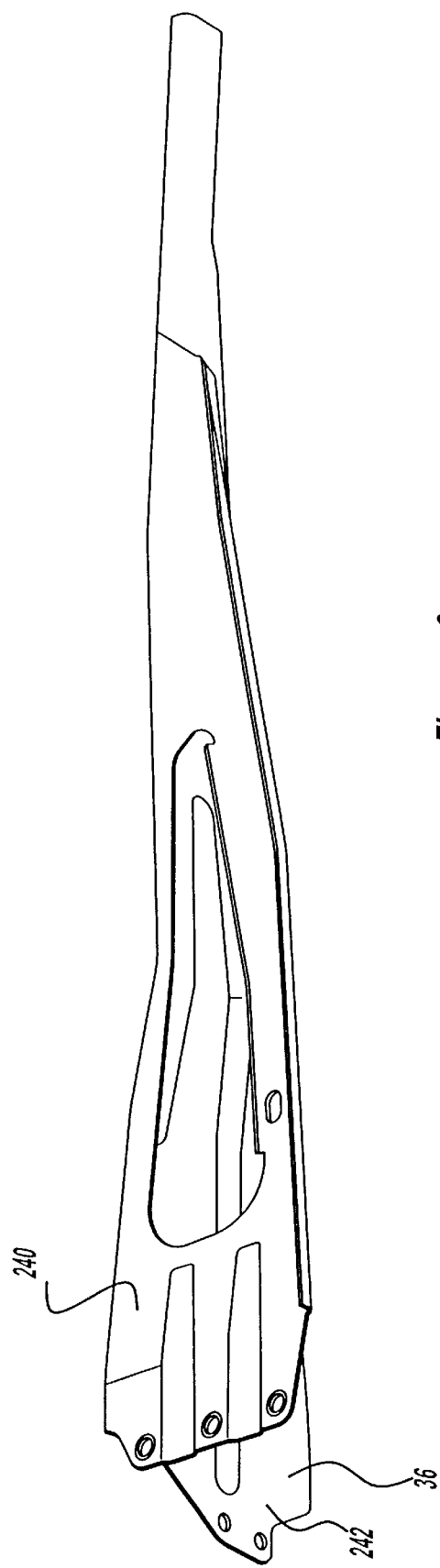
FIG. 8 is an alternative perspective view of the torque arm of the present invention.
Figure 9:
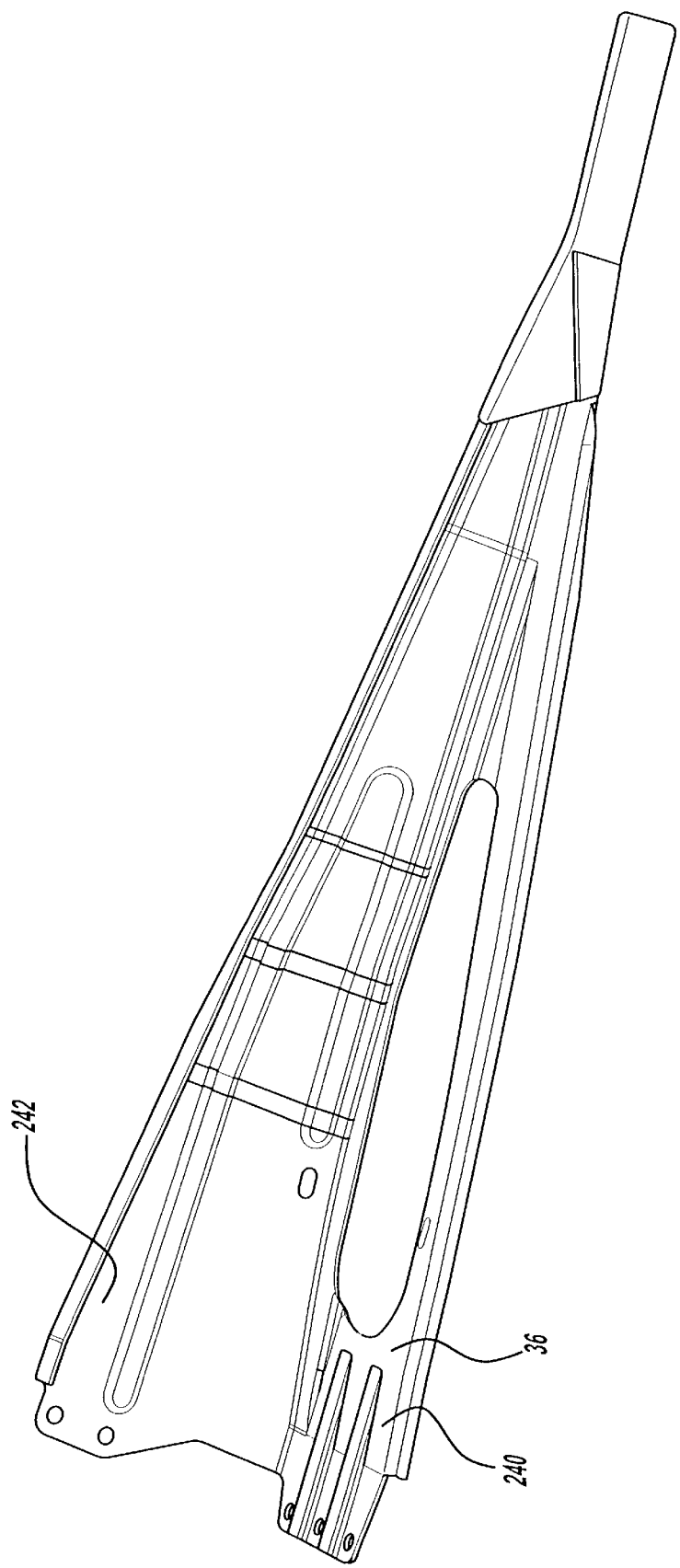
FIG. 9 is yet another alternative perspective view of the torque arm of the present invention.

Referring now to FIGS. 5 and 6, the present invention provides the following advantages with respect to the system. The rear differential 30, speed sensing torque transfer device 28 and torque arm 36 combine to form a rear module 90 which is attached to the car frame 92 panel at three points (A, B and C). This attachment reduces noise, harshness and vibration (NVH) via rubber mounts 131 which act to operatively isolate vibrations. Asymmetrical torque arm 36 provides improved packaging flexibility and reduced packaging requirements. Torque arm 36 (shown in FIGS. 5–9) itself is designed to act as a heat shield against exhaust system components 94 and to protect the temperature sensitive driveline components of the systems while providing structural support described below.

The speed sensing torque transfer device 28 provides improved traction performance combined with reduced driveline windup during cornering, reduced fuel consumption in normal driving conditions, and improved braking stability. As shown in FIG. 19, the torque limiter valve 190 is designed to accommodate the torque limiter function and a vehicle speed dependent torque transfer characteristic to reduce the torque transfer capacity of the system with increasing vehicle speed. This function reduces the sensitivity of the all wheel drive system regarding tire size variation, spare wheel usage, and worn tires which may cause excessive speed difference between the axles. Speed sensing torque transfer device 28 may also be equipped with a thermal valve 192 to protect the system against overheating wherein speed sensing torque transfer device 28 is deactivated and no torque transfers from the rear propshaft through to the rear halfshaft assemblies when a certain temperature is reached.

Figure 18:
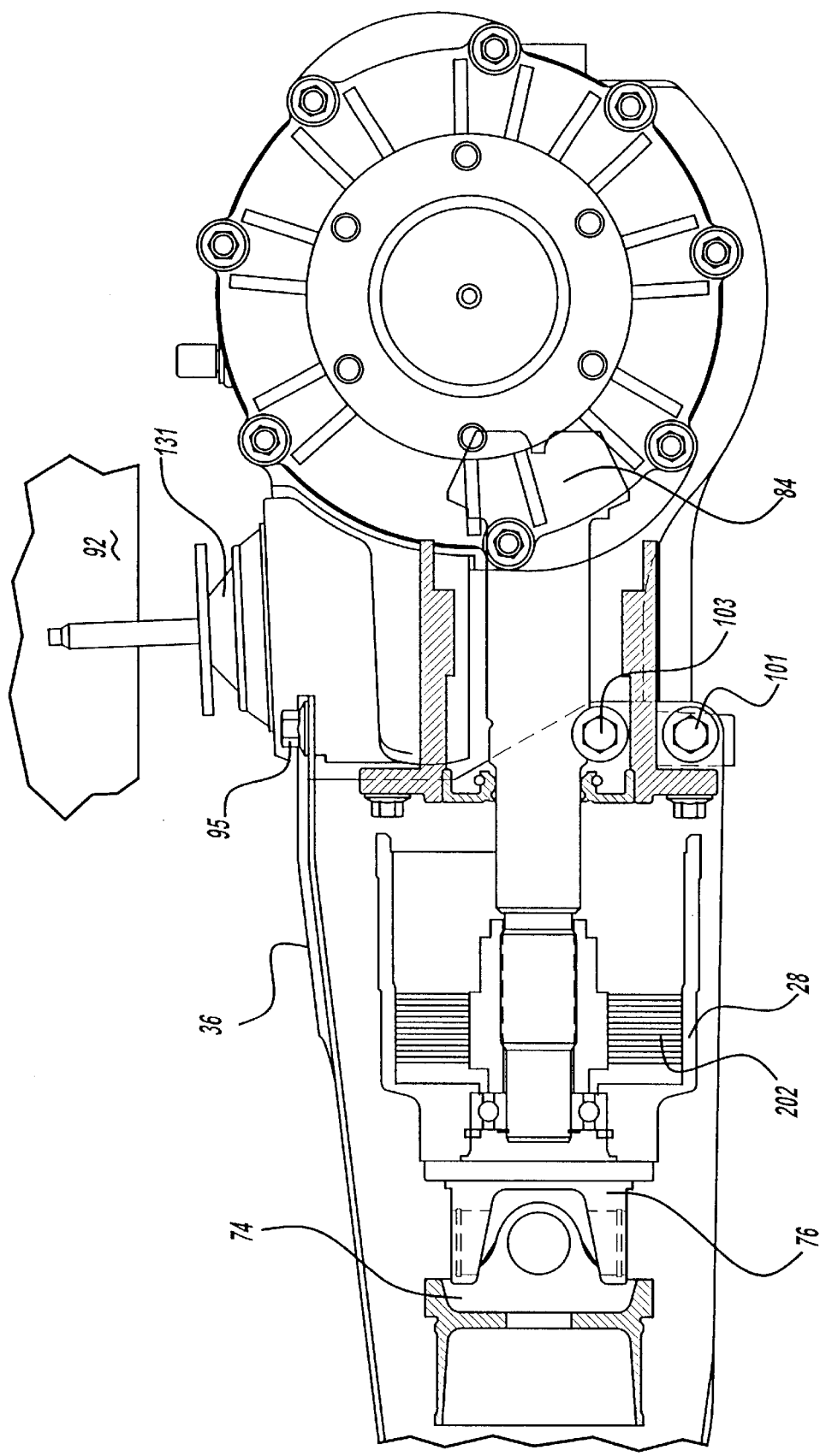
FIG. 18 is a partially cross sectional view of the cardan joint, speed sensing torque transfer device and differential of the present invention.

Referring to FIGS. 18 and 19, it should be noted that FIG. 18 discloses an embodiment wherein the speed sensing torque transfer device 28 is completely enclosed and operational as a single unit. FIG. 19 shows and alternative embodiment wherein the speed sensing torque transfer device 28 is open to an oil bath which is enclosed by encasement member 194. Encasement member 194 encloses the oil bath such that the speed sensing torque transfer device 28 may be cooled by the surrounding oil. Further included in FIG. 19 is oil scoop 196 which upon rotation obtains and moves oil into the clutch plates 82 and 86 further cooling the speed sensing torque transfer device 28.

Figure 10:
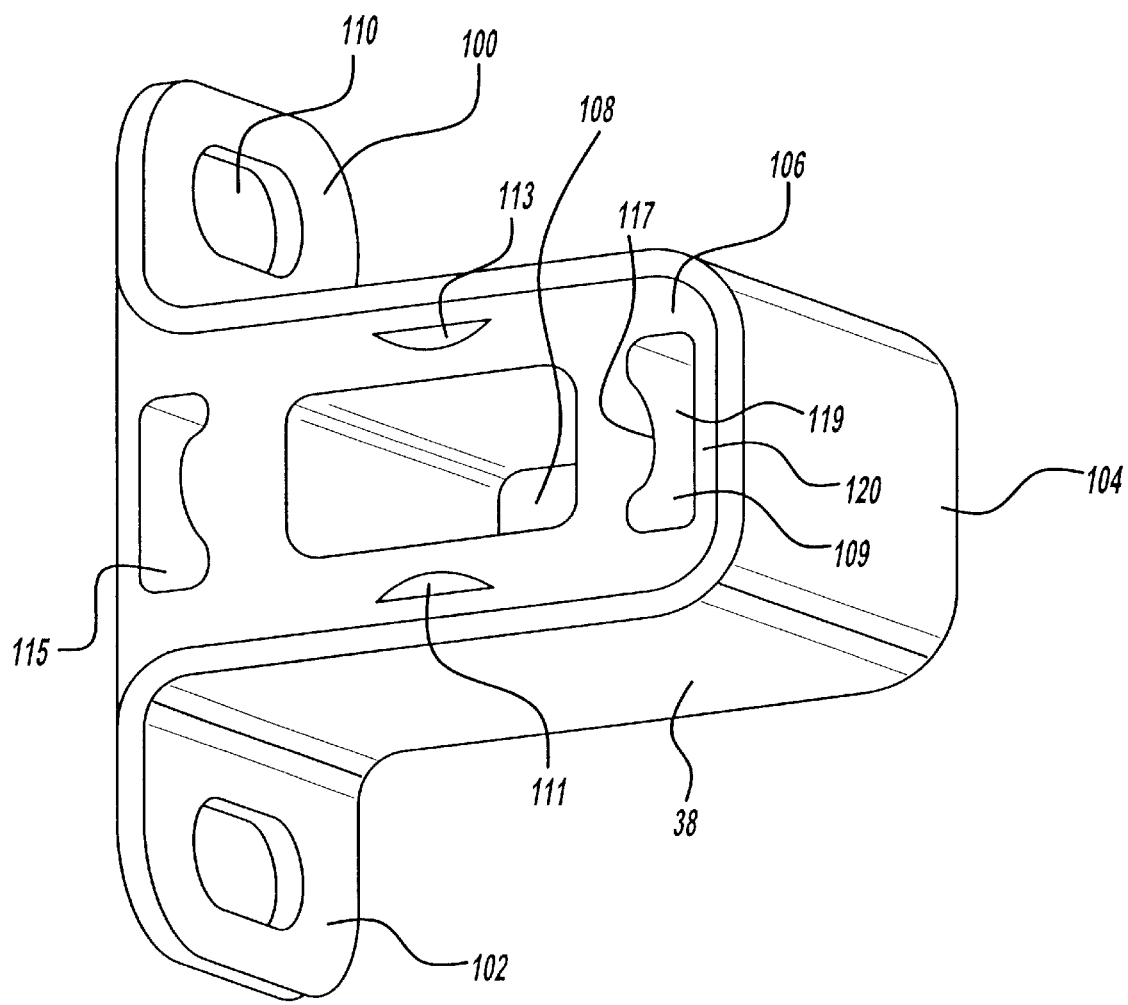
FIG. 10 is a perspective view of the torque arm mount of the present invention.

Referring now to FIG. 10, there is shown torque arm mount 38 having a generally u-shaped cross section. Torque arm mount 38 includes a first arm member 100 extending off the center section 104 and a second arm member 102 also extending off the center section 104. Arm members 100 and 102 each include a connection hole 10 for use in connecting the torque arm mount to the undercarriage of the vehicle. The connection can be made by any necessary fastening means such as bolts, screws, or riveting means. FIG. 10 further discloses a center portion 106 of the torque arm mount which is manufactured from a soft rubber material. The rubber material is molded directly onto the center section 104 of the torque arm mount. The center portion 106 includes a opening 108 which cooperates with section 120 of the torque arm 36 as shown in FIG. 5. Section 120 of the torque arm fits directly into the center section of the torque arm mount 38. It is contemplated that the center section 106 being manufactured of rubber may be tuned to special dampening and stiffness characteristics. Further, the center section 106 includes special dampening cavities 109, 111, 113, and 115 which act to provide a very soft initial dampening and then a second tier harder dampening. More specifically, the initial rubber structure is easily deformable in the first stage up until the point section 117 contacts section 119. At that point deformation or compression becomes harder as compressing the rubber material at 120 is more difficult.

As shown in FIGS. 18 and 19, the torque arm 36 is directly bolted to the outer face of the rear differential by bolts 95, 97 and 99 also shown in FIG. 5. Further, there are additional bolts 101 and 103 on side section 242 of torque arm 36 that bolt torque arm 36 to rear differential 30 as shown in FIG. 6. Referring to the top of rear differential 30, there are shown rubber mounts 131 attached directly to the undercarriage of the vehicle 92. It is also contemplated that the rubber mounts 131 are tuned for dampening and stiffness characteristics to allow for the appropriate noise NVH suitability of the vehicle. As an advantage, torque arm 36 in combination with rear differential connections A, B and C form an asymmetrical triangular connection. The torque arm rear differential connection provides for a longer span between the torque arm mount 38 and the mounts A and B of rear differential 30. It is known that a longer span proportionally reduces the run out and unbalance of the rear propshaft characteristic. Thus, NVH is reduced with a longer span. For installation purposes, rear module 90 is completely preassembled with the torque arm 36 bolted directly to the speed sensing torque transfer device 28 and rear differential 30. The preassembled rear module 90 is then bolted to the undercarriage or car frame 92 of the vehicle 66. This attachment is made substantially easier by the infinitely adjustable torque arm mount 38. Torque arm mount 38 has no set position such that the rear differential mounts and the torque arm mount 38 are bolted directed to the undercarriage 92 with any slack or misalignment being taken up instantaneously by the slidability and movability of the torque arm 36 within the torque arm mount 38. More specifically, the front section of the torque arm 120 is allowed to move freely within the torque arm mount 38 in the longitudinal direction (parallel to the propshaft) during the installation process. Upon final installation and securement of the torque arm mount 38 and rear differential mounts 131 to the undercarriage 92 of the vehicle 66 it should be understood that the torque arm 36 is not movable except in the longitudinal direction.

In addition, the long span between the torque arm mount 38 and the rear differential mounts 131 allows for soft rubber connections as the load between the rear differential mounts 131 and the torque arm mount are reduced. As it is known, the longer the distance between the torque arm mount 38 and the rear differential mounts 131 reduces the load that must be carried by each individual mounting section. Thus, the NVH characteristics of the entire powertrain system are improved. Torque arm mount 38 is manufactured from a stamped or pressed sheet metal. The rear differential 30 is manufactured from aluminum. The rear differential 30 is a standard open rear differential.

Figure 25:
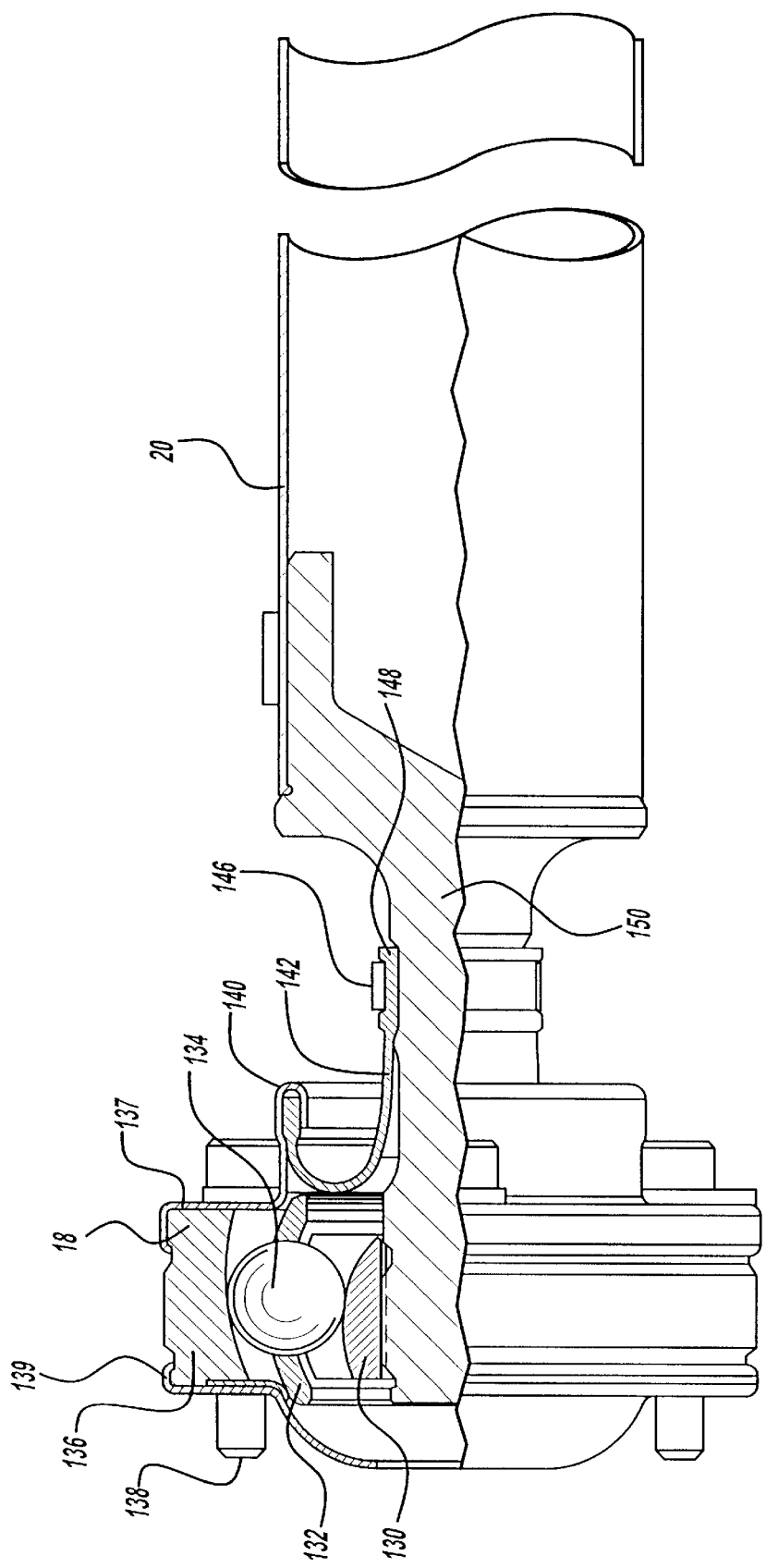
FIG. 25 is an enlarged partially cross sectional view of the high speed fixed joint and front propshaft assembly.

Referring now to FIG. 24, there is shown generally a partially cross sectional view of the entire propshaft system. FIG. 24 illustrates the high speed fixed joint 18, the front propshaft 20, the VL or cross groove style plunging constant velocity joint 22, the center bearing assembly 70, the rear propshaft 24 and the cardan joint assembly 26. More specifically, FIG. 25 shows a high speed fixed joint 18. High speed fixed joint 18 includes an inner race 130, a cage 132, a plurality of balls (6) represented by reference numeral 134, an outer race 136, a front can portion 137, a rear can portion 139 and a plurality of bolts 138 which are used to compress the front can portion 137 and 139 together to hold the various components in place. As shown in FIG. 25, the constant velocity joint boot 142 which is utilized to hold grease within the constant velocity joint. There is also shown a clamp 146 which clamps end 148 of boot 142 onto the splined section 150 of front propshaft 20. Splined front section 150 interacts with the inner race 130 of high speed fixed joint 18. As is known in the art, torque is thereby transmitted from the splined portion 150 to the inner race 130 through the balls 134 into the outer race 136.

Figure 29:
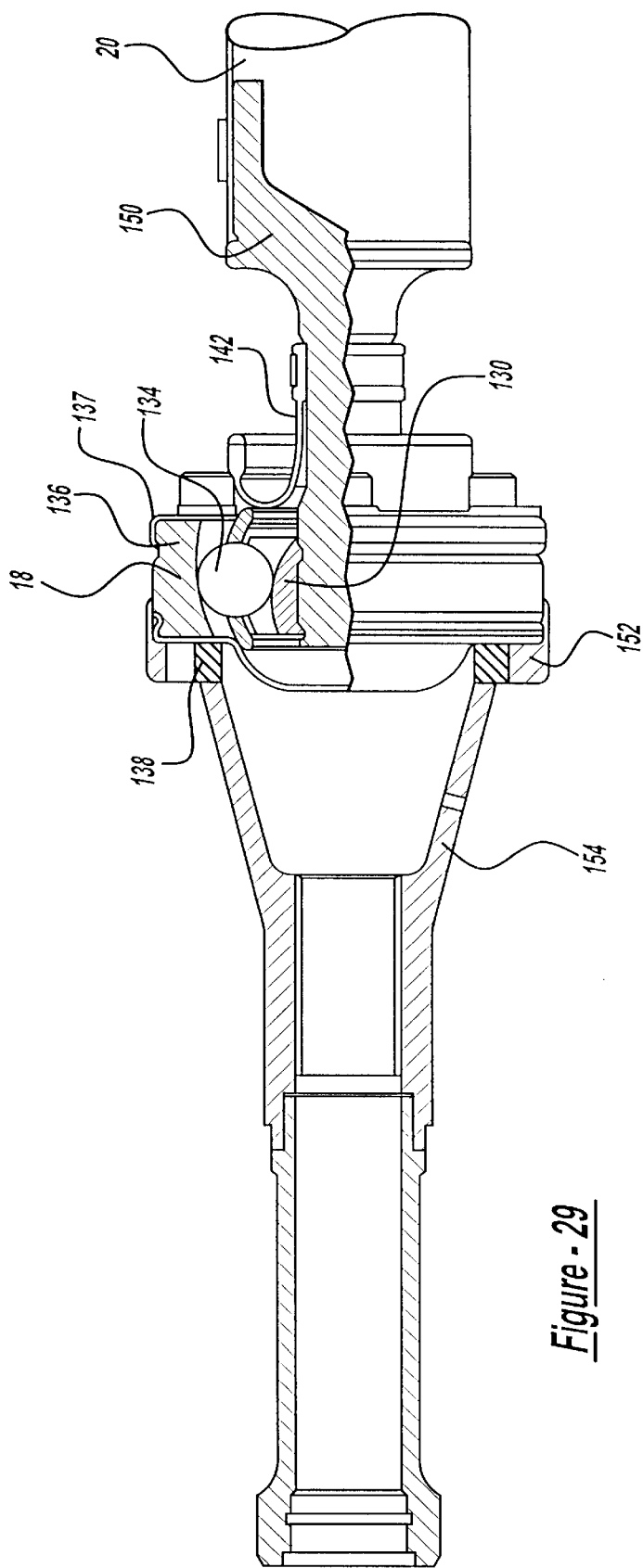
FIG. 29 is a partially cross sectional view of the power take-off unit connection high speed fixed joint and front propshaft.

Referring now to FIG. 29, there is shown high speed fixed joint 18 of the present invention operatively connected to the power transmission take-off connection 154. Power transmission take-off connection 154 includes a shoulder section 152 which is used to connect directly to the outer race of the high speed fixed joint 18. As is shown in FIG. 29, bolts 138 are secured directly to shoulder 152 of the power transmission take-off connection 154. In this manner, torque can be transmitted through section 154 through to the high speed fixed joint 18 and through to the front propshaft 20.

Referring now to FIG. 26, there is shown a partially cross sectional view of the VL type high speed fixed joint 22 and the center bearing assembly 70. Referring now to the end of the front propshaft 20, there is shown a connecting member 160 which is operatively connected to the outer race 170 of the VL type cross groove constant velocity joint 22. The VL type cross groove constant velocity joint includes a inner race 162, a cage 164, (6) balls referenced as reference numeral 166, and as described before an outer race 170. Both the inner and outer races include cross grooves for such cross groove type as known in the art. Cross groove constant velocity plunging joints provide angular excursion of up to 22 degrees and axial plunging movement of up to 525 millimeters. Cross groove joints transmit driveline torque while providing constant rotational velocity at all operating angles and allow for driveline movement caused by engine transmission and suspension travel. High speed cross groove joints as shown in the present invention offer excellent axial movement and excellent NVH performance.

Still referring to FIG. 26, there is shown the front spline portion 172 of the rear propshaft assembly 24. The spline portion 172 extends into the inner race 162 of the VL type cross groove constant velocity joint. Constant velocity joint boot 174 is shown enclosing the constant velocity joint 22 for use in keeping grease inside the joint in operation is kept onto the joint and shaft respectively as shown.

Figure 27:
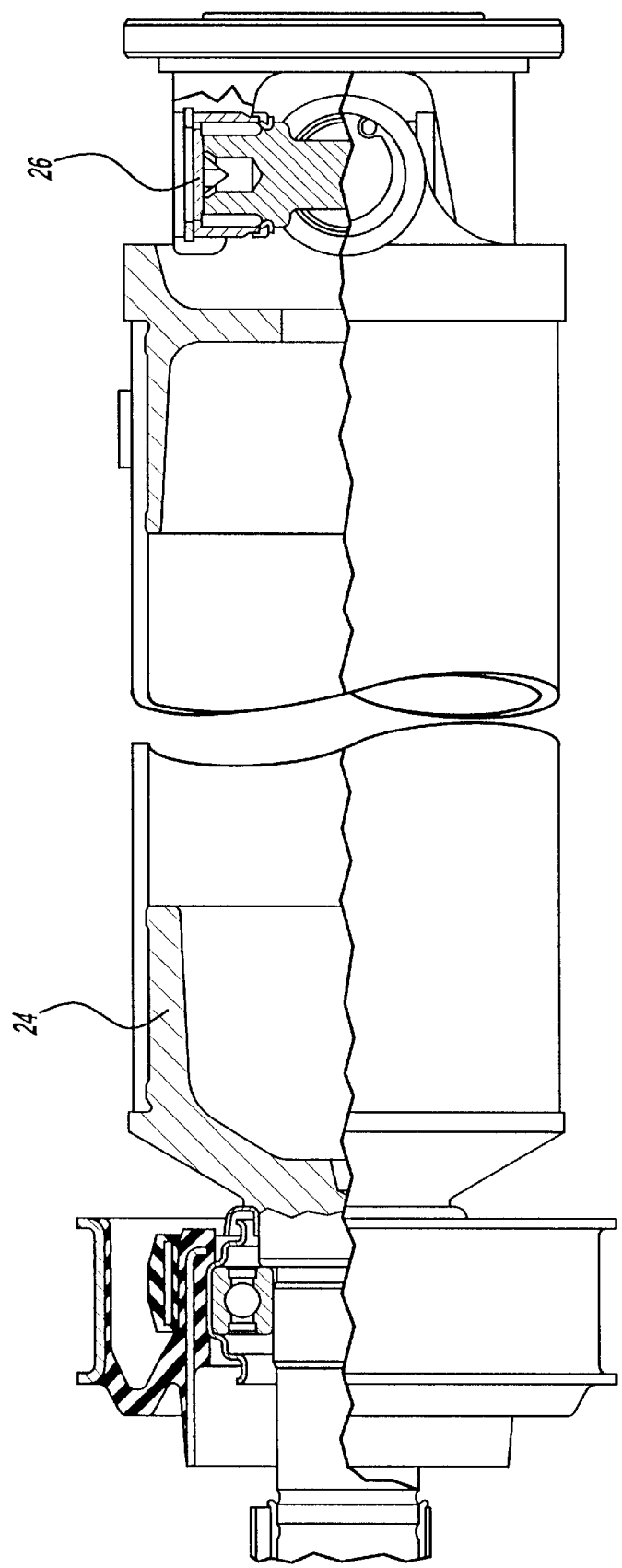
FIG. 27 is a partially cross sectional enlarged view of the center bearing assembly, rear propshaft and cardan joint assembly.

Center bearing assembly 70 is also shown in FIG. 26 and 27 and includes a bearing assembly 180, can structure 182, a rubber mounting section 184, a bracket section 186. It can be seen that center bearing assembly 70 allows front portion 172 of the rear propshaft 24 to rotate freely while still being structurally supported by the center bearing assembly. The rubber portion 184 allows for improved NVH slight movements in the drive system.

Figure 28:
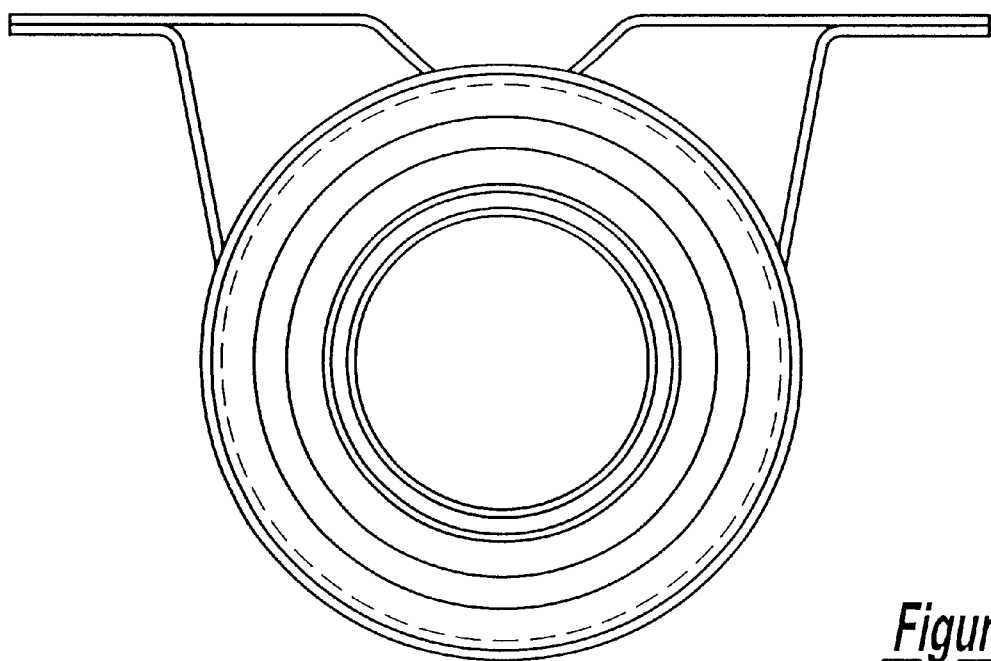
FIG. 28 is a side view of the center bearing assembly looking in a direction toward the rear differential.

Referring to FIG. 28, there is shown a side view of the center bearing assembly 70 of the present invention looking in a direction towards the rear differential and also down the longitudinal access of the rear propshaft. Referring now to FIG. 27, there is shown the rear propshaft assembly 24 including the cardan joint assembly 26. Cardan joint assembly 26 is a standard cardan joint.

The entire all wheel drive system must have a first bending frequency response greater than 100 hertz. The advantages of that are that at any speed the driveline will have excellent NVH characteristics.

What is claimed is:

1. A torque arm assembly for use with motor vehicle having an exhaust system, a differential and a speed sensing torque transfer device comprising:

a torque arm having an elongate body for protecting said speed sensing torque transfer device from heat radiated by said exhaust system of a motor vehicle, said torque arm having an asymmetric configuration and affixed to said differential and also to said motor vehicle to reduce the torque reaction load of differential; and a torque arm mount slidably affixable to said torque arm allowing positional adjustment of the torque arm in relation to said torque arm mount.

2. The torque arm assembly of claim 1 wherein said torque arm mount includes a dampening cavity for providing an initial dampening and a second tier dampening.

3. The torque arm assembly of claim 2 wherein said torque arm mount further comprising:

a body member having a center section, a first arm member extending off one side of said center section and a second arm member extending off the opposite side of said center section;

a center portion comprised of a compliant material, said center portion defining an opening for receiving a torque arm; and at least one dampening cavity formed to said center portion to absorb vibration from said torque arm.

4. The torque arm assembly of claim 1 wherein said torque arm mount has a generally "U" shaped cross section.

5. The torque arm assembly of claim 1 wherein said torque arm mount includes a center section, a pair of extending arm members and a center portion, said center portion manufactured from a dampening material.

6. The torque arm assembly of claim 5 wherein said dampening material is rubber.

7. The torque arm assembly of claim 5 wherein said center portion includes an opening for receiving said torque arm.

\* \* \* \* \*